(12) United States Patent
Song et al.

(10) Patent No.: US 12,536,631 B2
(45) Date of Patent: Jan. 27, 2026

(54) SYSTEM AND METHOD FOR ENHANCING VISUALIZATION OF COLORIMETRIC ASSAY READOUTS

(71) Applicant: DOMUS DIAGNOSTICS, INC., Park City, UT (US)

(72) Inventors: Xin Song, Raleigh, NC (US); John H. Reif, Durham, NC (US)

(73) Assignee: DOMUS DIAGNOSTICS, INC., Park City, UT (US)

( * ) Notice: Subject to any disclaimer, the term of this patent is extended or adjusted under 35 U.S.C. 154(b) by 44 days.

(21) Appl. No.: 18/752,268

(22) Filed: Jun. 24, 2024

(65) Prior Publication Data

US 2024/0428386 A1  Dec. 26, 2024

Related U.S. Application Data

(60) Provisional application No. 63/522,872, filed on Jun. 23, 2023.

(51) Int. Cl.
*G06T 5/94* (2024.01)
*G01N 33/52* (2006.01)
(Continued)

(52) U.S. Cl.
CPC .............. *G06T 5/94* (2024.01); *G01N 33/52* (2013.01); *G06T 5/60* (2024.01); *H04N 23/85* (2023.01);
(Continued)

(58) Field of Classification Search
None
See application file for complete search history.

(56) References Cited

U.S. PATENT DOCUMENTS

| 2004/0036704 A1* | 2/2004 | Han | H04N 9/68 348/E9.053 |
| 2006/0013478 A1* | 1/2006 | Ito | H04N 9/643 358/1.9 |

(Continued)

FOREIGN PATENT DOCUMENTS

WO  WO-2023210081 A1 * 11/2023 ............. G06F 21/32

OTHER PUBLICATIONS

English translation of WO-2023210081-A1, Miura, 2023 (Year: 2023).*

(Continued)

*Primary Examiner* — James M Hannett
(74) *Attorney, Agent, or Firm* — Workman Nydegger

(57) ABSTRACT

Disclosed are a system and method for enhancing the visualization, classification, and/or interpretation of a photonic readout of a colorimetric assay. The colorimetric assay is associated with a defined color spectrum that includes a positive region indicative of positive test results and a negative region indicative of negative test results. The system and method operate to receive an image of the photonic readout, convert the image to a predefined color space, enhance image saturation and hue, and adjust a brightness level of the image. The system and method increase visual contrast between the negative and positive regions of the color spectrum specific to the colorimetric assay, making the readout easier to interpret for both users with normal vision and users with variations of color weakness or blindness.

21 Claims, 29 Drawing Sheets
(28 of 29 Drawing Sheet(s) Filed in Color)

(51) Int. Cl.
G06T 5/60 (2024.01)
H04N 23/85 (2023.01)
H04N 23/86 (2023.01)

(52) U.S. Cl.
CPC ......... *H04N 23/86* (2023.01); *G06T 2200/24* (2013.01); *G06T 2207/20081* (2013.01); *G06T 2207/20084* (2013.01); *G06T 2207/30004* (2013.01)

(56) References Cited

U.S. PATENT DOCUMENTS

2009/0249393 A1* 10/2009 Shelton .............. H04N 21/2368
375/E7.076
2010/0284583 A1* 11/2010 Ljung .................... G01N 33/52
382/128

OTHER PUBLICATIONS

International Search Report and Written Opinion received for PCT Patent Application No. PCT/US24/35278, mailed on Sep. 20, 2024, 9 pages.
Ramirez-Coronel et al. "Smartphone-facilitated mobile colorimetric probes for rapid monitoring of chemical contaminations in food: advances and outlook," Critical Reviews in Analytical Chemistry, Dec. 29, 2022, pp. 9.

* cited by examiner

H: 0.00
S: -1.0
V: 0.00

Delta Y:
220-155 = 65

H: 0.25
S: -1.0
V: 0.00

Delta Y:
214-153 = 61

H: 0.50
S: -1.0
V: 0.00

Delta Y:
209-145 = 64

H: 0.75
S: -1.0
V: 0.00

Delta Y:
211-137 = 74

H: 1.00
S: -1.0
V: 0.00

Delta Y:
214-134 = 80

H: 1.25
S: -1.0
V: 0.00

Delta Y:
222-137 = 85

H: 1.50
S: -1.0
V: 0.00

Delta Y:
217-144 = 73

H: 1.75
S: -1.0
V: 0.00

Delta Y:
217-152 = 65

H: 1.25
S: 2.0
V: 0.00

H: 1.25
S: 2.5
V: 0.00

H: 1.25
S: 3.0
V: 0.00

H: 0.00
S: 3.0
V: 0.00

H: 0.10
S: 3.0
V: 0.00

H: 0.20
S: 3.0
V: 0.00

H: 0.70
S: 3.0
V: 0.00

H: 1.10
S: 3.0
V: 0.00

H: 1.15
S: 3.0
V: 0.00

H: 0.00
S: 0.0
V: 0.00

H: 0.10
S: 3.0
V: 0.00

H: 0.10
S: 2.8
V: 0.70

H: 0.00
S: 0.0
V: 0.00

H: 0.20
S: 3.0
V: 0.00

H: 0.20
S: 3.0
V: 0.95

H: 0.00
S: 0.0
V: 0.00

H: 0.00
S: 3.0
V: 0.00

**H: 0.25
S: 3.0**
V: 0.00

**H: 1.90
S: 3.0**
V: 0.00

H: 0.80
S: 3.0
V: 0.00

H: 0.80
S: 1.7
V: 1.20

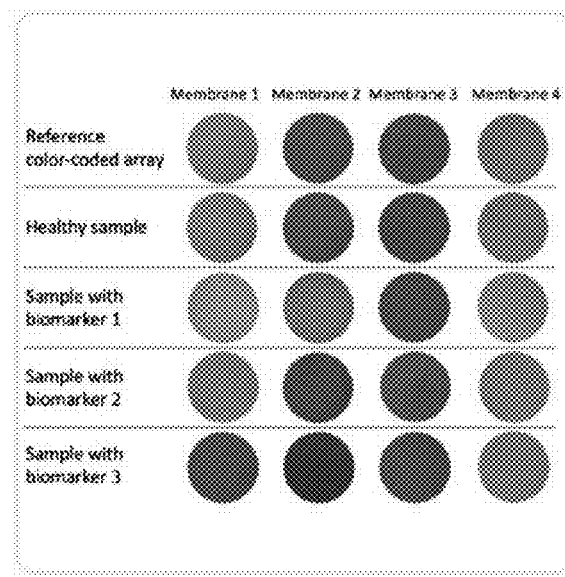
FIG. 15A
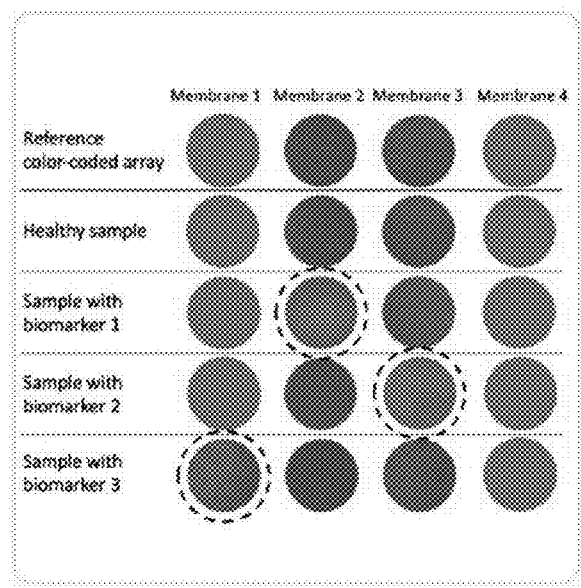 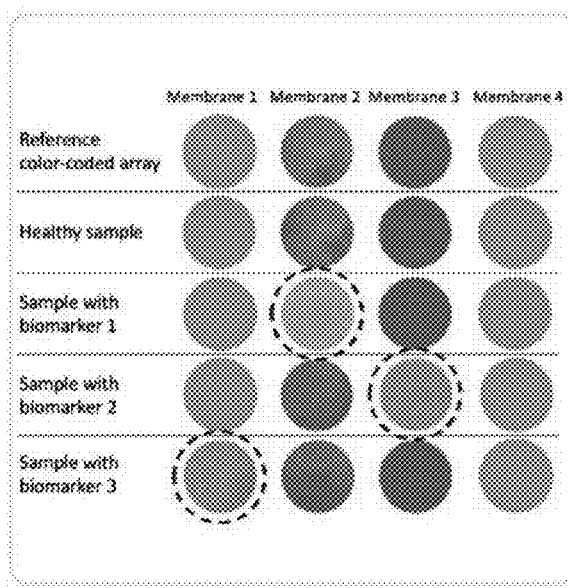
FIG. 15B　　　　　　　　　　FIG. 15C

SYSTEM AND METHOD FOR ENHANCING VISUALIZATION OF COLORIMETRIC ASSAY READOUTS

CROSS-REFERENCE TO RELATED APPLICATIONS

This application claims priority to and the benefit of U.S. Provisional Application No. 63/522,872, filed Jun. 23, 2023, and titled "Methods and Algorithms for Enhancing the Visualization, Classification, and Interpretation of Colorimetric Assay Readouts for Vision-Normal and Vision-Deficient Users," the entirety of which is incorporated herein by reference.

BACKGROUND

Colorimetric Assay Readouts make use of one or more colorimetric, chromogenic, fluorescent, bioluminescent, chemiluminescent, phosphorescent, and/or nanoparticle-based indicators or reagents for qualitative, semi-quantitative, or quantitative detection of target analytes. The target analytes may be molecules, compounds, biomarkers, metal ions, contaminants, or other types of products or byproducts of chemical and biochemical processes, reactions, and assays.[1] Results of colorimetric assays can be analyzed, interpreted, and/or quantified using specialized instrumentation such as a spectrophotometer that measures the absorbance of the particular analyte of interest or its associated chromogenic reaction at one or more characteristic optical wavelengths to determine the presence and/or the concentration of the target analyte in a sample. Colorimetric tests may be conducted in solution,[2] on substrate such as paper matrix (e.g., membrane, dipstick, lateral flow),[3,4] or in custom devices (e.g., microfluidics).[5]

Colorimetric assays with readouts within the visible color spectrum may allow simple interpretation by naked-eye inspection without the use of sophisticated instrumentation, thereby facilitating various useful applications including but not limited to pH measurement, metal ion detection, dipstick urinalysis, ELISA protein assays, colorimetric nucleic acid tests, and many other rapid low-cost tests and diagnostic assays used in the laboratory, at point-of-care locations, or at home. However, accurate interpretation of colorimetric test results by direct visual interpretation can be challenging, and often requires subjective interpretation, due to factors such as non-ideal contrast of the original test colors,[6] occurrence of ambiguous colors,[7] variations in ambient lighting conditions, differences based on particular image capturing devices,[8] and variability in color perceptions among different users including individuals with color vision deficiencies.[9,10]

Other approaches have failed to satisfactorily address these issues. Hira et al.,[9] for example, theorized that color rotation may aid image readout for colorblind people, but provided no direction for implementing this concept to chemical or biochemical assays. Kellner et al.[11] similarly applied color rotation and color stretch to improve a specific assay readout, but failed to provide any direction for identifying the optimal color rotation or color stretch settings. Their method is thus not generalizable beyond the specific assay studied. Accordingly, there is an ongoing need for improvements in the field of colorimetric assay readouts.

SUMMARY

Disclosed are a system and method for enhancing the visualization, classification, and/or interpretation of a photonic readout of a colorimetric assay. The colorimetric assay is associated with a defined color spectrum that includes a positive region indicative of positive test results and a negative region indicative of negative test results. The system and method operate to receive an image of the photonic readout, convert the image to a predefined color space, enhance image saturation and hue, and adjust a brightness level of the image. The system and method increase visual contrast between the negative and positive regions of the color spectrum specific to the colorimetric assay, making the readout easier to interpret for both users with normal vision and users with variations of color weakness or blindness.

The disclosed system and method can improve accuracy and reproducibility of interpretation of colorimetric assays for both vision-normal and vision-deficient users, without the need for sophisticated color analyzers or readers.

An image of the photonic readout can be first captured by an electronic image device (e.g., CMOS sensor or camera, such as a camera from a smartphone) and converted to a specific color space, such as CIE 1931, Hue-Saturation-Value (HSV), or Hue-Saturation-Lightness (HSL), then processed through a sequence of operations that adjust properties of the original test image (e.g., colors, hue, saturation, intensity, contrast, and/or brightness) to enhance the visual contrast of distinctive readout colors as defined by the particular colorimetric test.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the Drawings, like reference numerals may be utilized to designate corresponding or similar parts in the various Figures, and the various elements depicted are not necessarily drawn to scale.

FIGS. 15A-15C illustrate enhancement of previously generated colorimetric readout images directed to detection of multiple biomarkers from an example urine test.

DETAILED DESCRIPTION

Overview

Figure 1A:
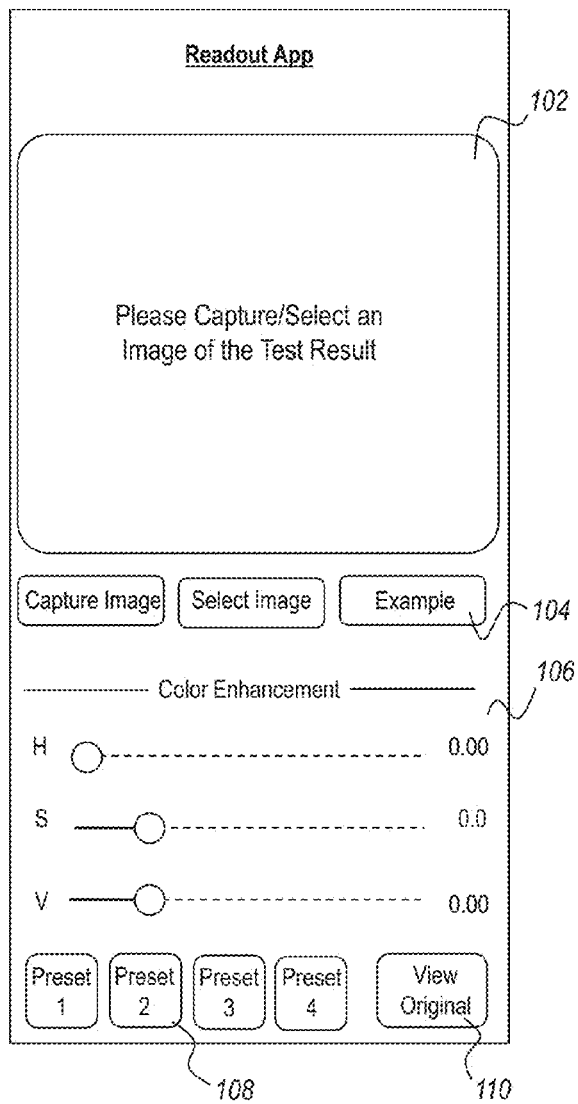
FIGS. 1A-1D illustrate an example user interface that can be used in conjunction with the disclosed systems and methods.

The present disclosure is directed to novel systems and methods to enhance the visualization, classification, and/or interpretation of colorimetric test results (qualitative, semi-quantitative, or quantitative) with improved accuracy and reproducibility for both vision-normal and vision-deficient users, without the use of sophisticated color analyzers or readers.

Colorimetric test results may also be referred to herein as "photonic readouts." The methods described herein can be broadly applicable for enhancing the readout visualization, classification, and/or interpretation of various custom-designed or commercial colorimetric assays, including assays whose readouts do not reside within the visible range of the optical spectrum. Examples include but are not limited to assays with colorimetric, chromogenic, fluorescent, bioluminescent, chemiluminescent, phosphorescent, infrared, electrochemical, and/or nanoparticle-based readouts. A photonic readout can be directly or indirectly formed by electromagnetic signals captured by a physical device such as sensors and cameras. The signals can comprise signals from the visible light spectrum and/or from outside the visible light spectrum. The signals can be used to form a digital image, with or without signal processing and/or conversion. The image can be single-color or multi-color when viewed by a human. An "assay" includes any process, reaction, protocol, or test for determining the presence or absence of one or more target analytes, and can be conducted in solution, on a substrate, or in a test device. Terms such as test and assay may be used interchangeably herein.

Colorimetric assays are associated with a color spectrum (also referred to herein as a color gradient), with negative and positive regions, that is defined by the particular assay. For example, certain assays rely on pH-based colorimetric results, with pink typically indicating a negative result, yellow indicating a positive result, and orange indicating an indeterminate/ambiguous result. Other assays rely on different colorimetric mechanisms and accordingly will define different color spectrums.

An image of the photonic readout can be first captured by an electronic image device (e.g., CMOS sensor, camera, or smartphone) and converted to a specific color space (e.g., CIE, HSV, HSL[11]), then calibrated and processed through a sequence of numerical or algorithmic operations (or any heuristics that accomplish such procedure) that adjusts certain properties of the original test image (e.g., colors, hue, saturation, intensity, contrast, and/or brightness) to enhance the visual distinguishability (used synonymously herein with "visual contrast") of distinctive readout colors as defined by the particular test.

The color enhancement procedure can involve color space transformation(s) including but not limited to linear transformations such as scale change and rotation, non-linear transformations with one or more rounds of matrix operations, or a combination thereof.

The image of the photonic readout can be acquired, calibrated, and converted to a predefined color space (e.g., HSV or HSL), subjected to desaturation or saturation, followed by hue rotation, followed by adjustment of brightness (i.e., "value" in HSV and "lightness" in HSL) and then optionally followed by one or more rounds of iterative fine-tuning of saturation, hue, and/or brightness, as needed, to obtain an optimal visual distinguishability of binary readouts (e.g., negative vs. positive), trinary readouts (e.g., negative vs. positive vs. ambiguous), or multi-value readouts (e.g., defined by multi-color arrays) as specified by a particular test or assay.

The method can be tunable (with or without user interactions) to enhance the visual distinction between the true positives, true negatives, and/or ambiguous readouts (which may cause incorrect readouts such as false positives or false negatives) of colorimetric assays. For example, the method may be tunable through manual interactions from the user and/or through one or more automated processes inherent to the method.

In a first embodiment, the method can determine one or more optimal color enhancement settings in the predefined color space (e.g., HSV or HSL) by first desaturating the image and then rotating the hue until detecting a near-maximum or maximum intensity difference between the negative and positive regions on the color spectrum as defined by the particular test or assay. There may exist more than one candidate hue values that effectively enhance such intensity difference on the desaturated image.

The method then selects the best hue value(s) and gradually increases the saturation of the image until it detects an effective or maximum visual distinguishability between the positive and negative regions on the color spectrum as defined by the particular test or assay. The method may repeat this process with the second-best hue value, the third-best hue value, etcetera.

As explained in more detail below, an "effective or maximum visual distinguishability" can be determined via one or more user interactions (e.g., through user selections and/or adjustments made via interaction with a user interface) and/or via an automated determination based on one or more quantifiable image metrics, such as using one or more suitable image analysis operations known in the art (e.g., any suitable image analysis tool that can determine and provide an objective measure of contrast between the positive and negative regions of the given color spectrum). The method may operate to optimize the color enhancement by repeating the saturation optimization process with the second-best hue value, the third-best hue value, etc.

Next, the method can adjust the brightness of the image to further optimize the perceived visual distinguishability (as perceived by the user and/or as determined by an automated image analysis operation) between the different types of readouts.

Next, the method can iteratively fine-tune the hue, saturation, and/or brightness of the image to further enhance the readout colors while avoiding ambiguous readouts (or minimizing overlapping/ambiguous colors by keeping them within a specified subregion on the color spectrum). In this manner, the method can distinguish not only the positive and negative readouts, but also ambiguous readouts on the color-enhanced image. Any of the determination steps may be accomplished via one or more user interactions and/or via automated image analysis operations.

In a second embodiment, the method can find one or more optimal color enhancement settings in the predefined color space (e.g., HSV or HSL) by first saturating the image and then rotating the hue until detecting an effective visually distinguishable color difference between the negative and positive regions with minimal ambiguous colors overlapping/confusing the positive and negative regions on the color spectrum defined by the particular test or assay. For example, the method may determine an effective or maximum visual distinguishability between the negative and positive regions on the relevant color spectrum, as those terms are used herein. There may exist more than one candidate hue value that meets this criterion.

The method then selects the best hue value(s) and reduces the saturation of the image until it detects the saturation value that achieves an optimal colorimetric visual distinguishability between the positive and negative regions while minimizing any overlapping/ambiguous colors by keeping them within a specified region on the color spectrum/gradient defined by the particular test or assay. The method may repeat the saturation optimization process with the second-best hue value, the third-best hue value, etcetera.

Next, the method can adjust the brightness of the image to further optimize the perceived visual distinguishability (as perceived by the user and/or as determined by an automated image analysis operation) between the different types of readouts.

Next, the method can iteratively fine-tune the hue, saturation, and/or brightness of the image to further enhance the readout colors while avoiding ambiguous readouts (or keeping ambiguous colors within a region specified on the color spectrum). In this manner, the algorithm is able to distinguish not only the positive and negative readouts, but also any ambiguous readout on the color-enhanced image. Any of the determination steps may be accomplished via one or more user interactions and/or via automated image analysis operations.

The colorimetric test from which the photonic readout is generated can be any type of chemical or biochemical assay that provides results via colorimetric, chromogenic, fluorescent, bioluminescent, chemiluminescent, phosphorescent, infrared, electrochemical, and/or nanoparticle-based readouts. The color enhancement method can be used for analyzing endpoint results or for monitoring the progression of chemical/biochemical reactions, protocols, assays, or tests. The target analyte(s) of the assay can include one or more types of molecules or compounds, such as one or more proteins, nucleic acids, viruses, bacteria, metal ions, contaminants, etcetera.

The colorimetric assays from which one or more images of the photonic readout are generated can involve nucleic acid amplification reactions that are either thermocycling-based, isothermal, enzymatic, or enzyme-free. Examples include but are not limited to loop-mediated isothermal amplification (LAMP), reverse-transcription LAMP (RT-LAMP), dual-priming isothermal amplification (DAMP), cross-priming amplification (CPA), strand displacement amplification (SDA), rolling circle amplification (RCA), recombinase polymerase amplification (RPA), helicase-dependent amplification (HDA), nucleic acid sequence-based amplification (NASBA), multiple displacement amplification (MDA), whole genome amplification (WGA), genome exponential amplification reaction (GEAR), exponential amplification reaction (EXPAR), nicking and extension amplification reaction (NEAR), single chimeric primer isothermal amplification (SPIA), isothermal and chimeric primer-initiated amplification of nucleic acid (ICAN), hairpin fluorescence probe-assisted isothermal amplification (PHAMP), signal-mediated amplification of RNA technology (SMART), beacon-assisted molecular detection (BAD AMP), CRISPR-Cas9-triggered nicking endonuclease-mediated strand displacement amplification (CRISDA), as well as enzyme-free nucleic acid amplification methods such as hybridization chain reaction (HCR), catalyzed hairpin assembly (CHA), exponential hairpin assembly (EHA), entropy-driven catalysis (EDC) such as toehold-mediated strand displacement (TMSD), polymerase chain reaction (PCR), reverse-transcription PCR (RT-PCR), quantitative real-time PCR (qPCR), reverse-transcription qPCR (RT-qPCR), and variations and combinations thereof.

The colorimetric nucleic acid assay from which one or more photonic readout images are generated can be based on pH-dependent or pH-independent LAMP or RT-LAMP, for example.

Readout indicators can make use of reagents including but not limited to pH sensitive dyes such as Phenol Red, Neutral Red, Cresol Red, Cresol Red, Cresolphthalein, Cresol Purple, Thymol Blue, Methyl Orange, Bromophenol Blue, Congo Red, Methyl Orange, Alizarin Red, Bromocresol Green, Dichlorofluorescein, Methyl Red, Bromocresol Purple, Chlorophenol Red, Bromothymol Blue, Naphtholphthalein, Phenolphthalein, Cresolphthalein, Thymolthalein, Indigo Carmine, fluorescent/intercalating dyes such as SYBR Green, SYBR Safe, SYBR Gold, GelRed, Ethidium Bromide, Propidium Iodide, Crystal Violet, DAPI, 7-AAD, Acridine Orange, Hoechst stains, Calcein, Malachite Green, Methyl Green, EvaGreen, Eriochrome Black T, Hydroxynaphthol Blue, Leuco Crystal Violet, Rodamine, Texas Red, FITC, TRITC, SYTO dyes, pyridylazophenol dyes such as 2-(5-Bromo-2-pyridylazo)-5-[N-propyl-N-(3-sulfopropyl) amino]phenol (5-Bromo-PAPS), 2-(5-Nitro-2-pyridylazo)-5-[N-n-propyl-N-(3-sulfopropyl) amino]phenol (5-Nitro-PAPS), nanoparticle-based indicators such as gold nanoparticles, and other types of indicators such as colored/fluorescent polystyrene beads, fluorescent nanodiamonds, quantum dots, etcetera.

The color enhancement method disclosed herein can also be applied to assays with single-color readout (e.g., dipstick or lateral flow) by enhancing the perceived visual contrast between the test color and any potentially interfering background color(s) (e.g., the background color of the dipstick).

The color enhancement method disclosed herein may be carried out to apply color enhancement to the entire image or to one or more selected subregion(s) of the image.

The transformed image can be presented to one or more human users via a display of a computer device, and the transformed image can provide a visual qualitative, semi-quantitative, or quantitative detection of target analytes. The transformed image can additionally or alternatively be analyzed by one or more computer devices, which can make a visual qualitative, semi-quantitative, or quantitative detection of target analytes. The transformed image can be presented to one or more human users as well as be analyzed by one or more computer devices, which make a visual qualitative, semi-quantitative, or quantitative detection of target analytes.

The image of the photonic readout can be optimized after initial visual recognition determinations are made by a human user. Alternatively, the image of the photonic readout can be optimized prior to any visual recognition determinations made by a human user.

The color enhancement method disclosed herein may involve interactions between the user and a computer system (used synonymously herein with computer device) carrying out at least a portion of the method. For example, the system may operate to display a selection of one or more sample images to the user during one or more steps of the method (e.g., following hue adjustment, saturation adjustment, and/or brightness adjustment) and then receive user selection as to which image presents the best visual distinguishability. Additionally, or alternatively, the system may operate to display a sample image along with user control options (e.g., sliders or other suitable user interface controls) for manually adjusting one or more image parameters (e.g., hue, saturation, brightness) to optimize visual distinguishability. Additionally, or alternatively, the system may include one or more presets tailored to adjust hue, saturation, and/or brightness of images based on predetermined adjustment parameters that are determined to work effectively for the defined color spectrum of a particular assay.

Additionally, or alternatively, the system may operate to automatically determine the best visual distinguishability at one or more steps of the method (e.g., using image contrast measurement tools known in the art). The method may be implemented, at least in part, using an application executable on a smartphone (or other mobile device), and that can use computer software, embedded systems, microcontrollers, processors, or any custom systems with necessary combination of hardware and software capable of image acquisition, processing, and image display.

These and other examples of a "computer," "computer device," or "computer system," as those terms are used herein, refer to any device comprising one or more processors and memory (e.g., in the form of one or more hardware storage devices). The memory can comprise instructions that are executable by the one or more processors to cause the computer system to carry out the steps of the method as disclosed herein. The computer system can include one or more applications for carrying out at least a portion of the disclosed method. The computer system can use any suitable programming languages and frameworks and can be deployed to devices running Android, IOS, MacOS, Windows, Linux, Unix, or any suitable operating system.

Such a system can fully automate or semi-automate the colorimetric readout process (with or without user instructions or interactions) including but not limited to the steps of image acquisition, image quality check, image perspective transformation, image color calibration and correction, color enhancement, test result analysis, interpretation, and/or reporting.

The functions of the method (e.g., as carried out by a suitable application on a suitable computer system) can be augmented with techniques including but not limited to image processing, computer vision, artificial intelligence, machine learning, deep learning, and/or neural networks to optimize the image acquisition, calibration, correction, feature detection and extraction, visualization, classification, and interpretation of colorimetric test results. Accordingly, any suitable image analysis technique known in the art may be utilized within the framework of the disclosed method to make determinations regarding visual contrast and/or other image properties.

The method can, either automatically or with instructions from the user, detect, identify, and/or extract one or more test regions (e.g., test pads, reaction wells, etc.) corresponding to the detection of one or more target analytes on a test device (e.g., test card, cassette, lateral flow, capillary tubes, microfluidics, etc.) and enhance the readout visualization, classification, and/or interpretation of one or more (or each) individual test region on the test device.

A color reference including one or more characteristic colors can be printed on the test device to facilitate necessary color calibration and/or corrections by the method to compensate for potential color deviations caused by variations in image acquisition parameters, such as differences in ambient lighting conditions or differences from various image capturing devices. Such calibration data can be pre-configured and stored in the system or collected and analyzed at the time of image capture.

Example User Interfaces

FIGS. 1A-1D illustrate an example user interface that can be used in conjunction with the disclosed systems and methods. In these examples, a mobile computer device, such as a smartphone, runs a color enhancement application that allows the user to take a photograph of the colorimetric readout test results (or otherwise obtain and upload an image of the readout), convert the photograph to HSV color space, and apply color optimization to enhance the readout visual contrast between positive, negative, and ambiguous test results. The example application has multiple pre-configured preset color enhancement modes that optimize colorimetric RT-LAMP readouts upon user selection. The example application also provides adjustable objects (sliders, in this example) corresponding to the hue, saturation, and lightness values. The disclosed user interface examples include certain user-selectable objects. Other embodiments may omit one or more of such selectable objects and/or may include other objects not illustrated.

FIG. 1A shows an example user interface 100 that includes an image display area 102 and a color enhancement control area 106. The color enhancement control area 106 includes selectable objects that enable user adjustment of hue (H), saturation(S), and value (V) (sometimes referred to as brightness, or as lightness in the HSL space). In this example, the selectable objects are sliders with associated numerical indicators, though other embodiments can additionally or alternatively include other user-adjustable interface objects known in the art, such as dials, numerical input boxes, pie menus, rotary switches, spinners/steppers, dropdown menus with predefined values, and the like.

As shown, the user interface 100 can also include an image selection region 104 with selectable objects that enable the user to capture an image (e.g., via a camera of the mobile device), select a saved image, or display an example image. The user interface 100 can also include one or more preset objects 108 for applying predefined color enhancements to an image. The user interface 100 also includes an original image object 110 for removing color enhancements and returning to the original image.

Figure 1B:
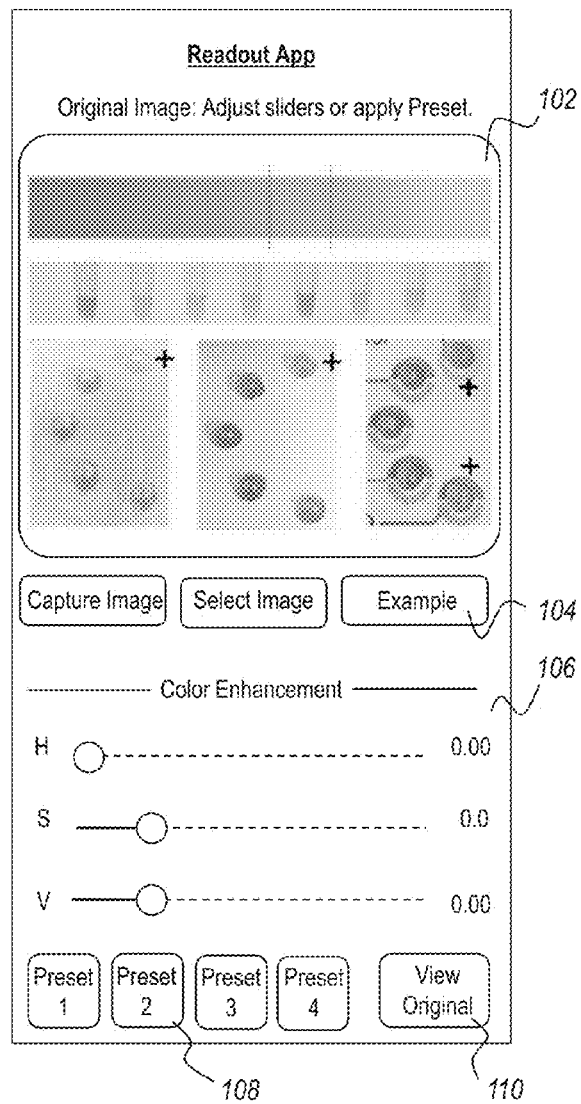
Figure 1C:
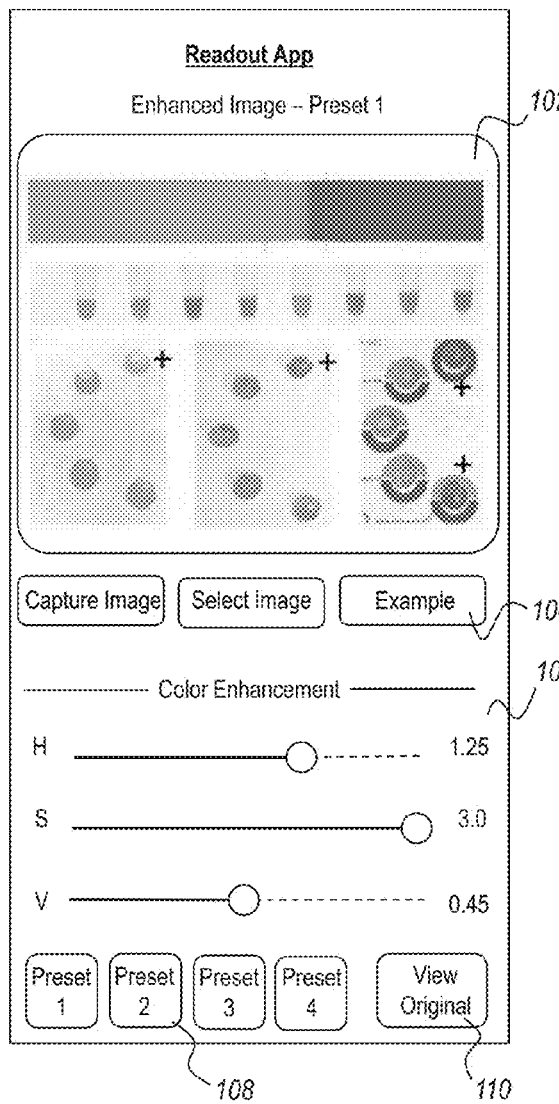
Figure 1D:
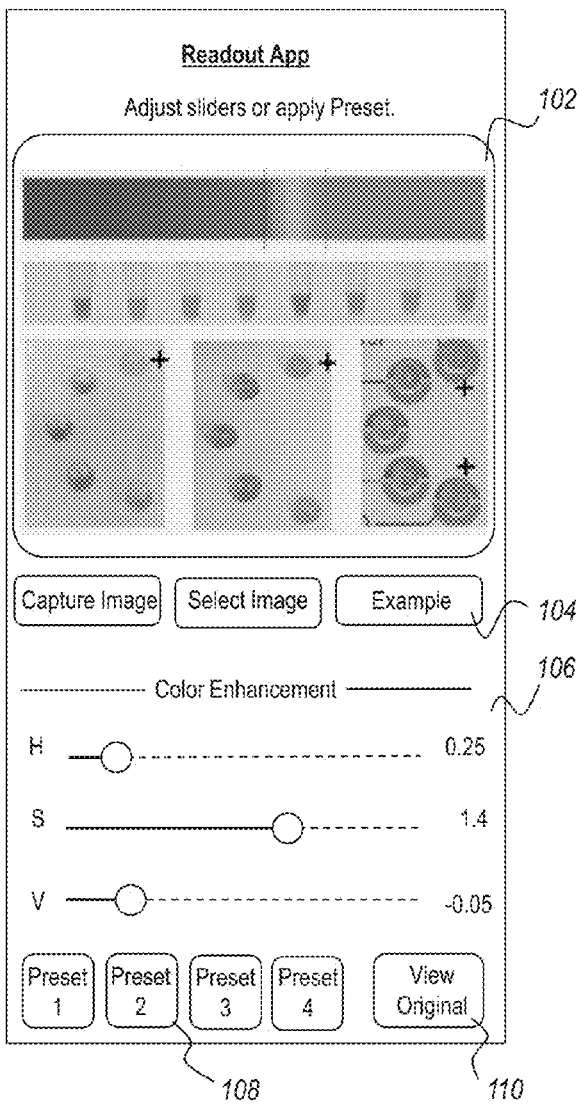

FIG. 1B shows the user interface 100 after an image of the photonic readout has been captured or selected for display in the image display area 102. FIGS. 1C and 1D show the user interface 100 after different color enhancements are applied. FIG. 1C shows an example following selection of a first preset, while FIG. 1D shows an example following custom adjustment of the selectable objects in the color enhancement control area 106.

Figure 2A:
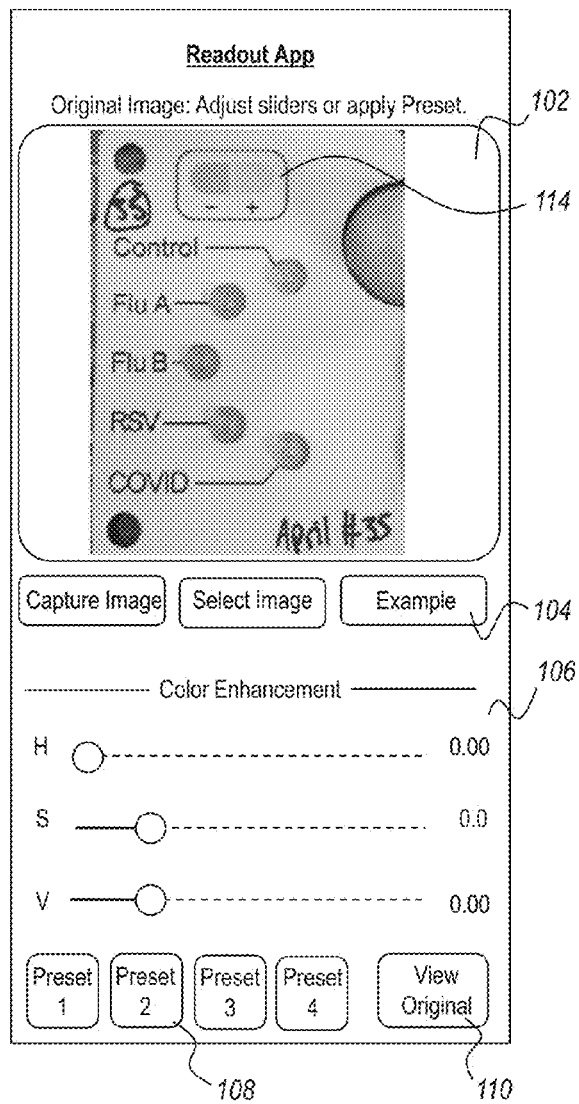
FIGS. 2A-2F show the example user interface displaying an image of an example colorimetric readout from a multiplex RT-LAMP colorimetric assay.
Figure 2B:
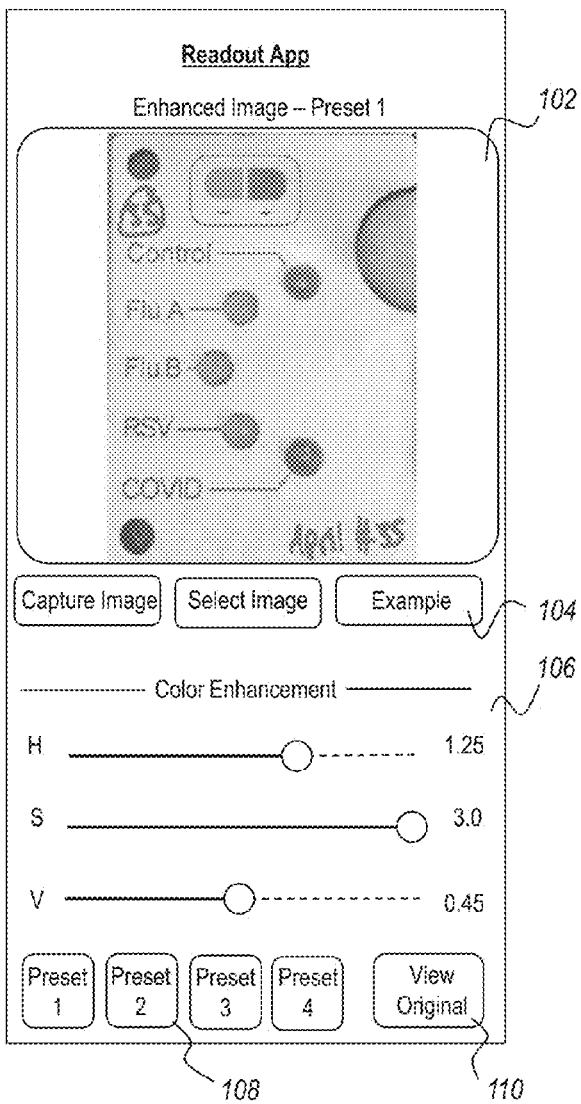
Figure 2C:
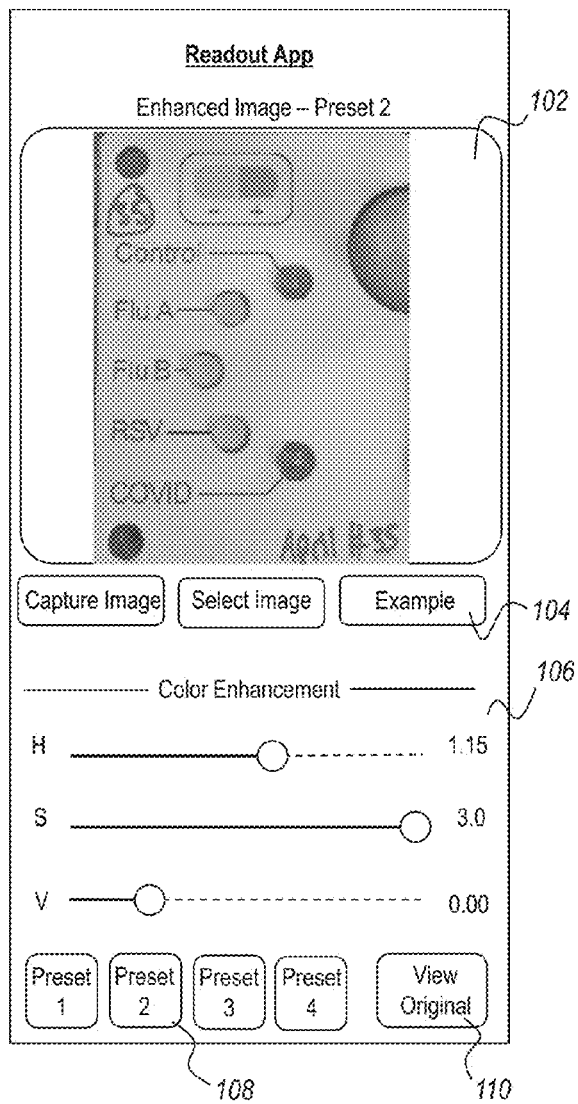
Figure 2D:
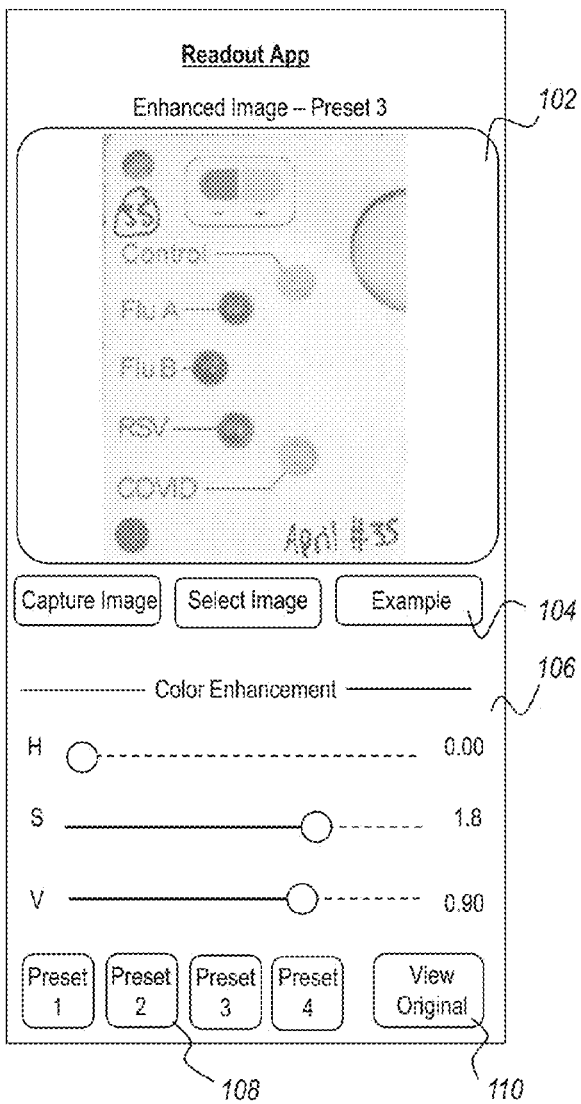
Figure 2E:
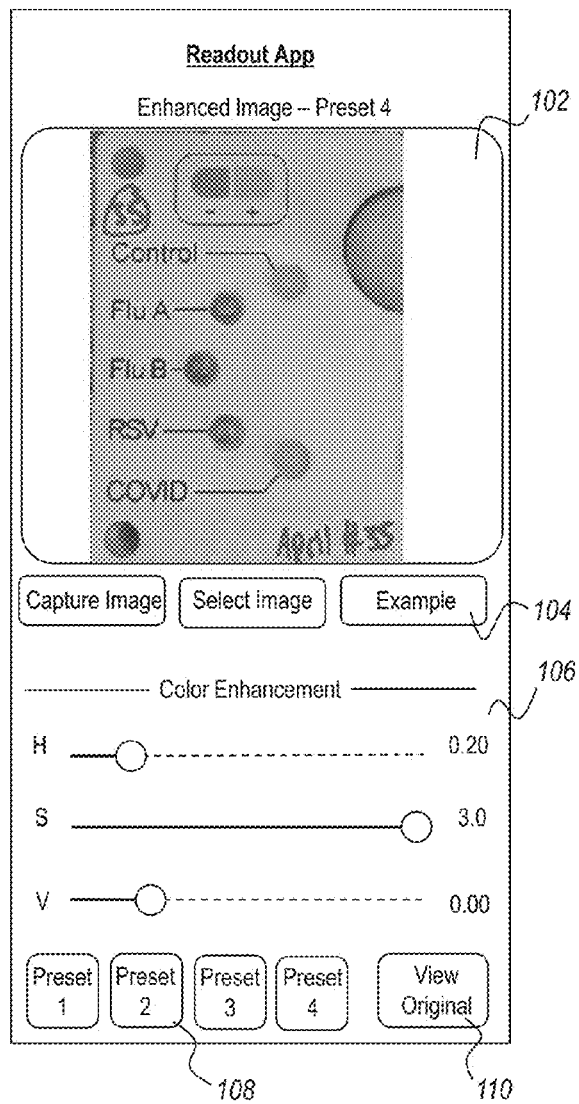
Figure 2F:
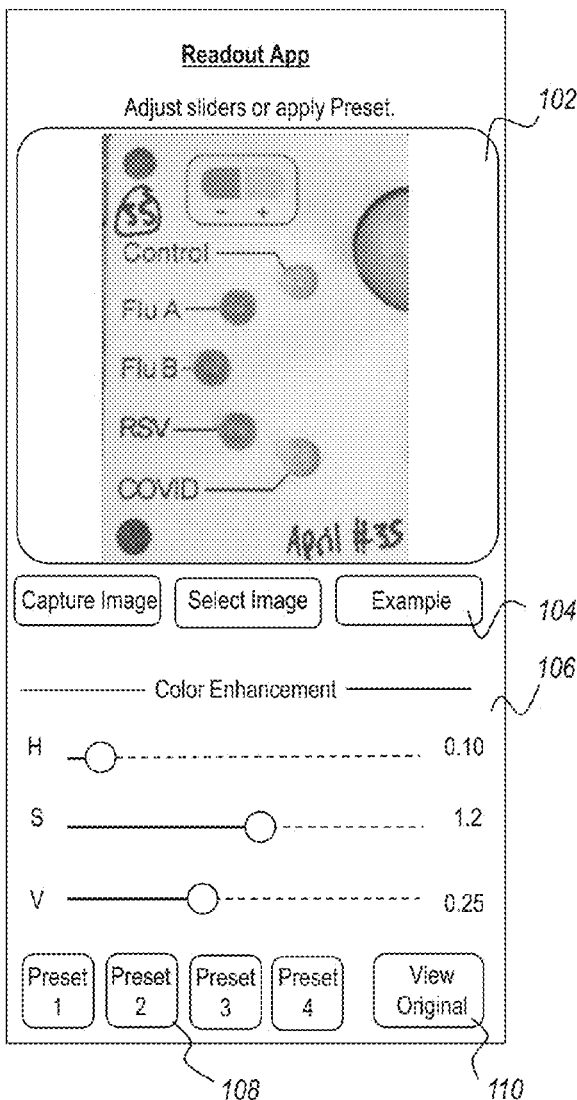

The form of the readout will vary depending on the device used to carry out the assay. The readout may include, for example, cells, test tubes, a test card, and the like. FIGS. 2A-2F show the user interface 100 after selecting an image of another example readout from a multiplex RT-LAMP colorimetric test. The illustrated readout also includes a color reference 114 to indicate how the colors correspond to test results. The images shown are the original readout image (FIG. 2A; negative=pink; positive=yellow), color enhanced image by preset mode 1 (FIG. 2B; negative=cyan; positive=magenta), color enhanced image by preset mode 2 (FIG. 2C; negative=cyan; positive=purple), color enhanced image by preset mode 3 (FIG. 2D; negative=red; positive=yellow), color enhanced image by preset mode 4 (FIG. 2E; negative=red; positive=green), color enhanced image by user specified HSV values (FIG. 2F; negative=red; positive=yellow).

Figure 3A:
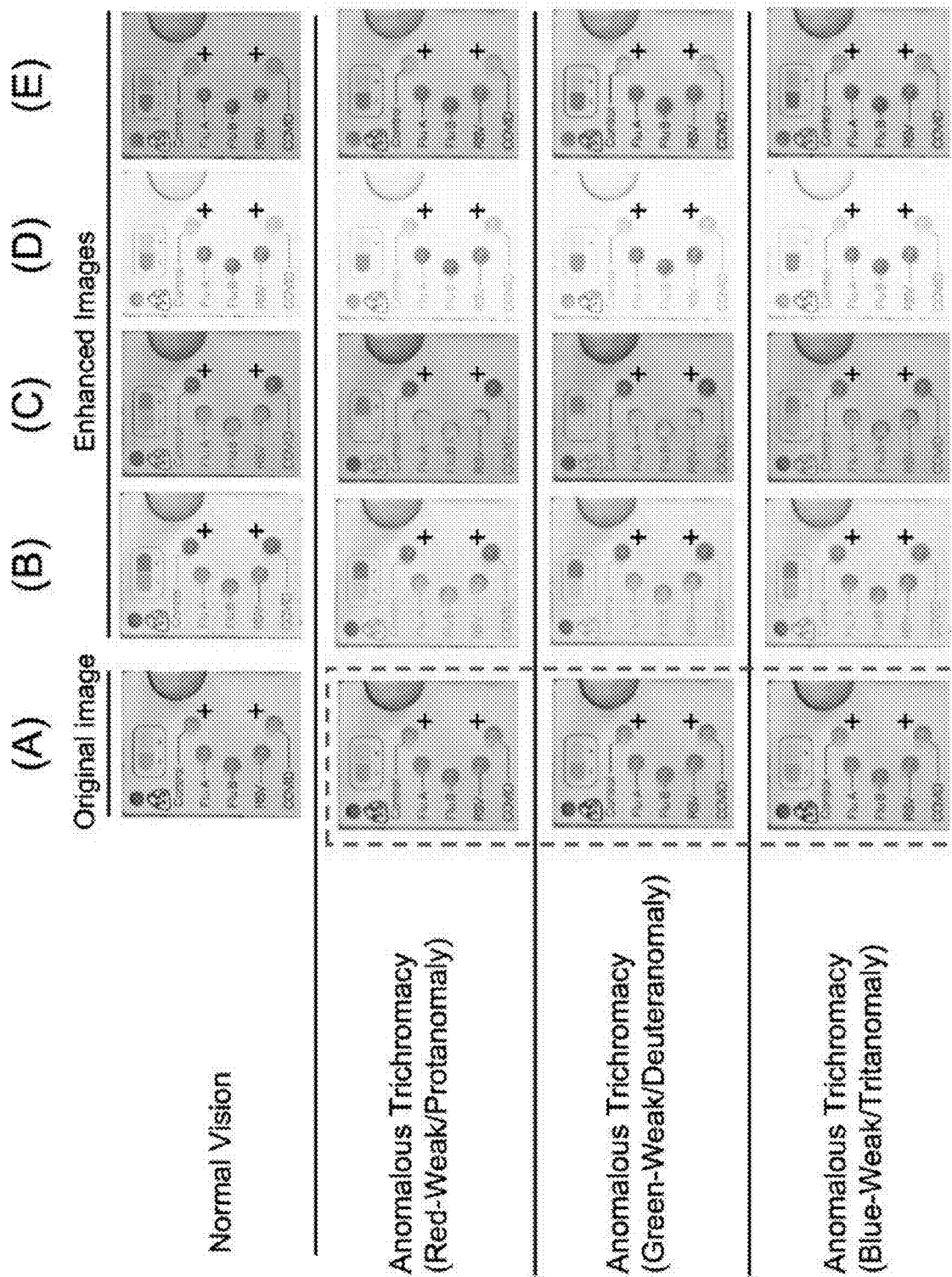
FIGS. 3A-3C show example screenshots from a color enhancement application, illustrating colorimetric readout enhancement of multiplex RT-LAMP test results for users with normal vision and users with different types of color weakness or blindness.
Figure 3B:
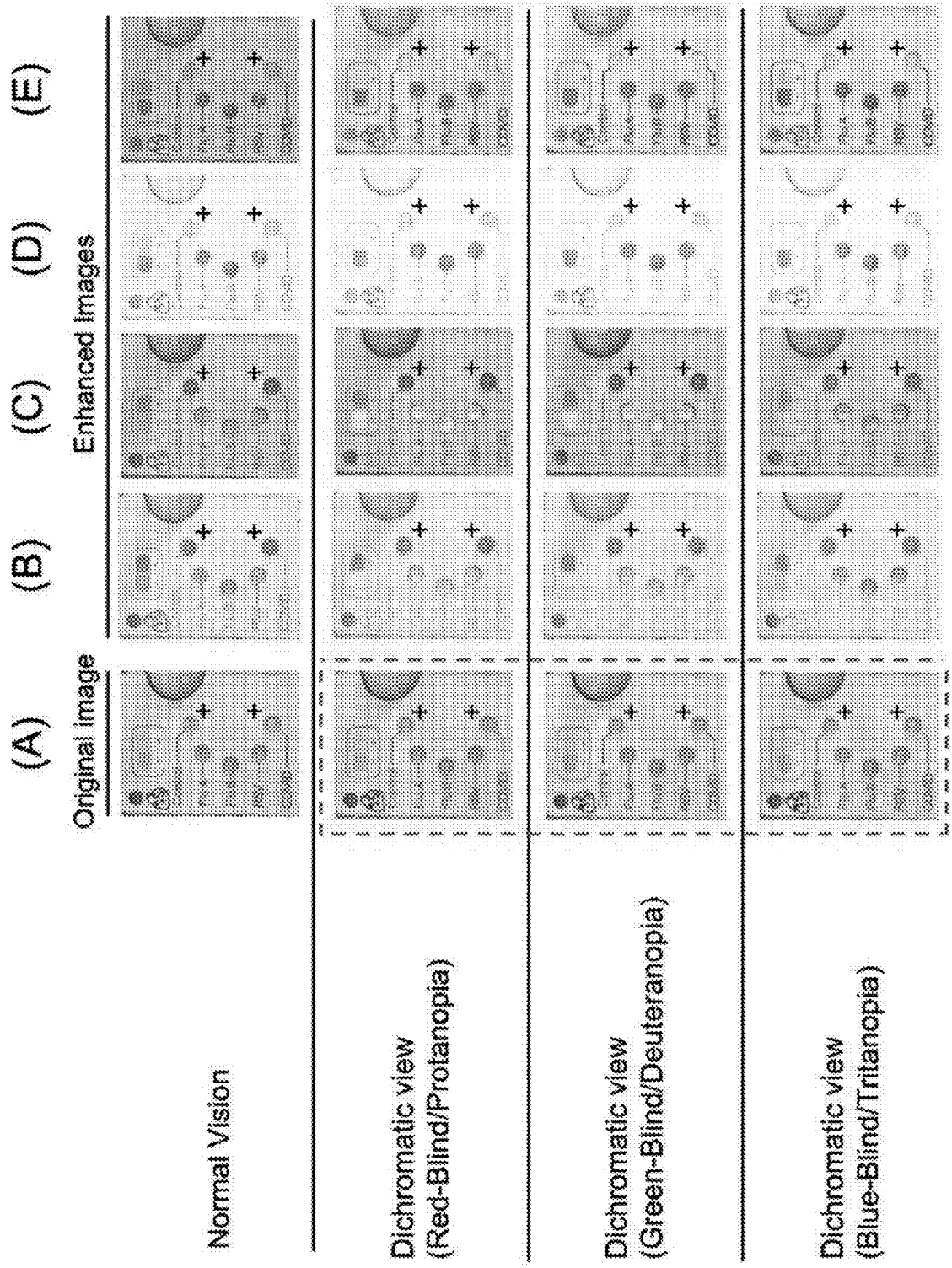
Figure 3C:
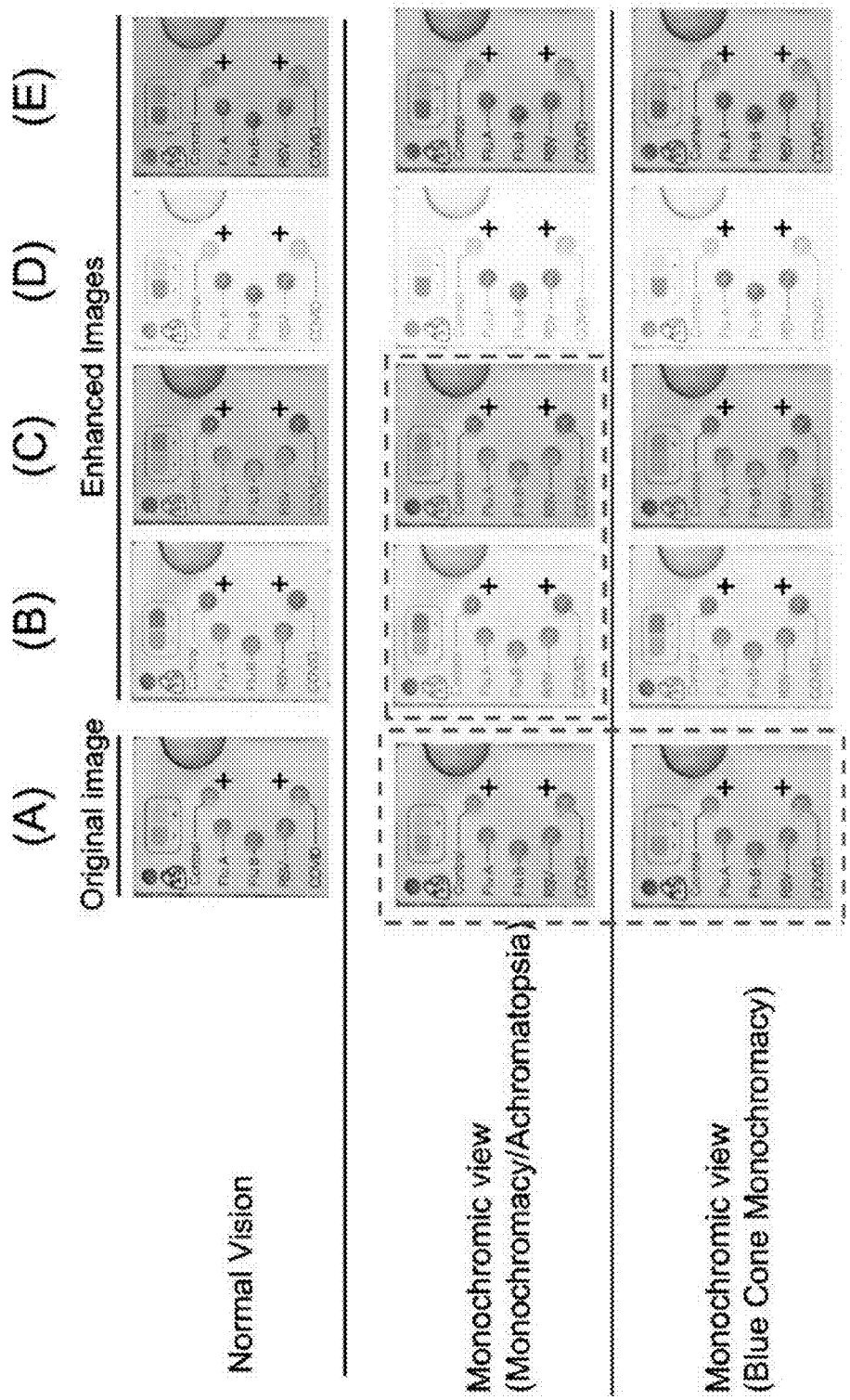

FIGS. 3A-3C tabulate example screenshots from the color enhancement application illustrating colorimetric readout enhancement of multiplex RT-LAMP test results for users with normal vision and users with different types of color weakness or blindness, as shown on the different rows. Columns (A)-(E) correspond to the original test image and color-enhanced test images based on the four pre-configured presets, respectively (H, S, and V values for the presets shown in the preset images of FIGS. 2B-2E). Images representing color-deficient views of the example test results are simulated using a publicly available color blindness simulator (the COBLIS simulator, maintained by Colblindor). Without enhancement, it can be challenging to correctly distinguish between positive and negative readouts, particularly for users with color deficiencies, as noted in the dotted boxes. In contrast, the color enhanced images can effectively improve the test result interpretation for both vision-normal and vision-deficient users.

Figure 4A:
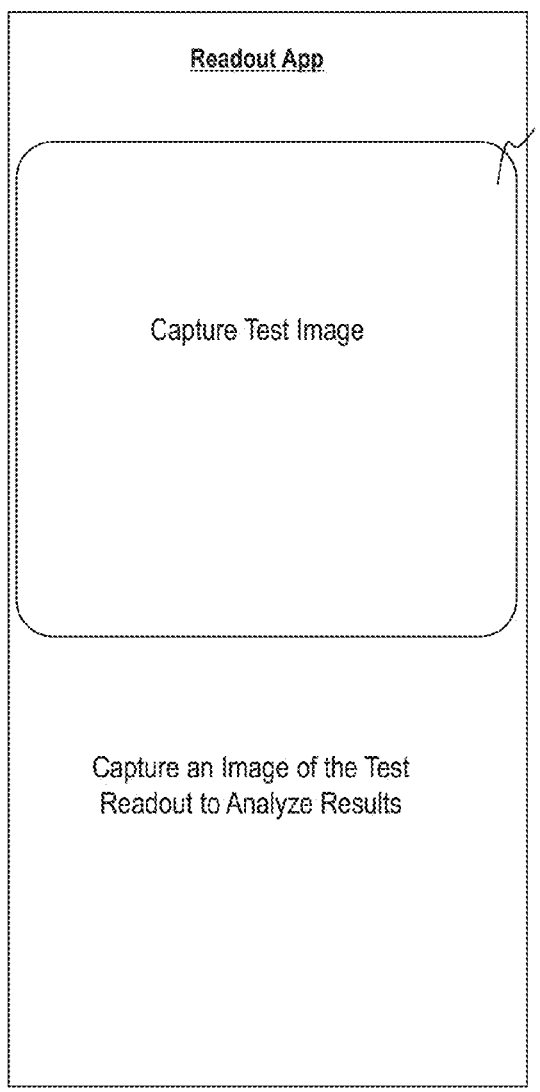
FIGS. 4A and 4B show an example user interface of a readout application useful for end users such as patients and clinicians.
Figure 4B:
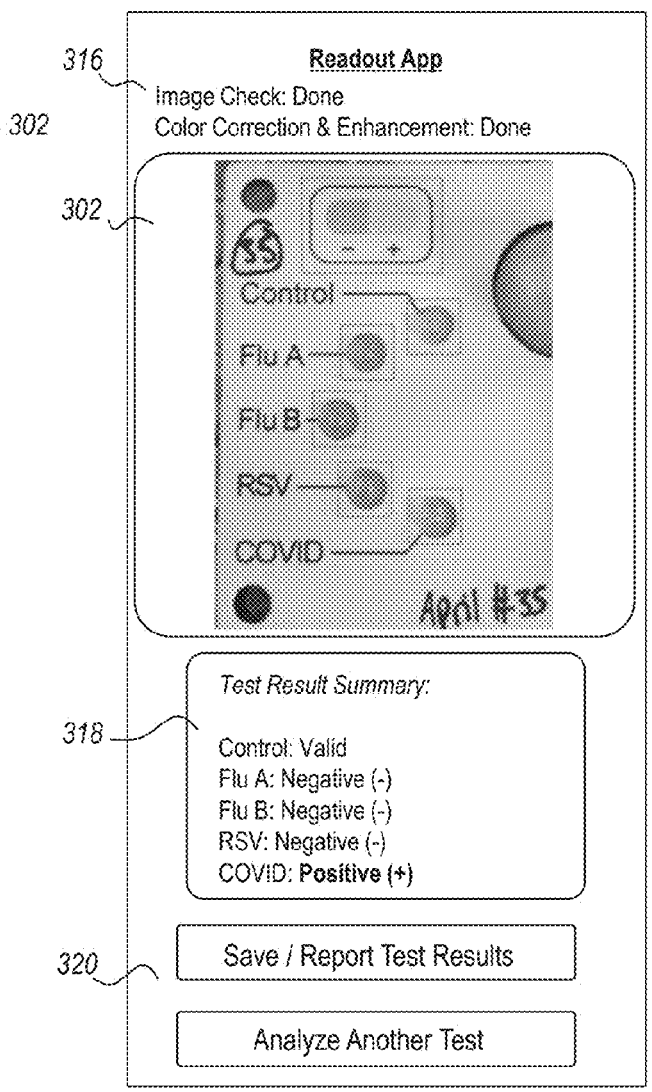

FIGS. 4A and 4B show an example user interface 300 of a readout application useful for end users (e.g., patients, clinicians). Features of the user interface 100 can be incorporated into the user interface 300, and vice versa. The user interface 300 includes an image display area 302, an image status indicator 316, a test results summary 318, and an options area 320 with selectable objects for saving/reporting test results and analyzing additional tests, for example. FIG. 4A shows the interface 300 prior to capture/upload of an image of a readout, and FIG. 4B shows the interface 300 following capture/upload of the image.

After capturing an image of the readout, the application can automatically perform one or more of: check the quality of the image, apply necessary image calibration/corrections (including but not limited to image perspective transform, white balancing, etc.), identify color reference (such as a chart), identify reaction wells or other colorimetric indicators of the readout corresponding to different targets of the test device (e.g., card), apply color enhancement to the image, analyze and interpret the test result for each target, and report a summary of the test results to the user. The application may also have functionalities such as scanning QR code or barcode to record information about the test kit and associating it with user-provided information so that test results can be reported to appropriate testing/surveillance agencies if required. The application may interface with other software modules or 3rd party services to provide additional functions to the application.

Example Method & System

Figure 5A:
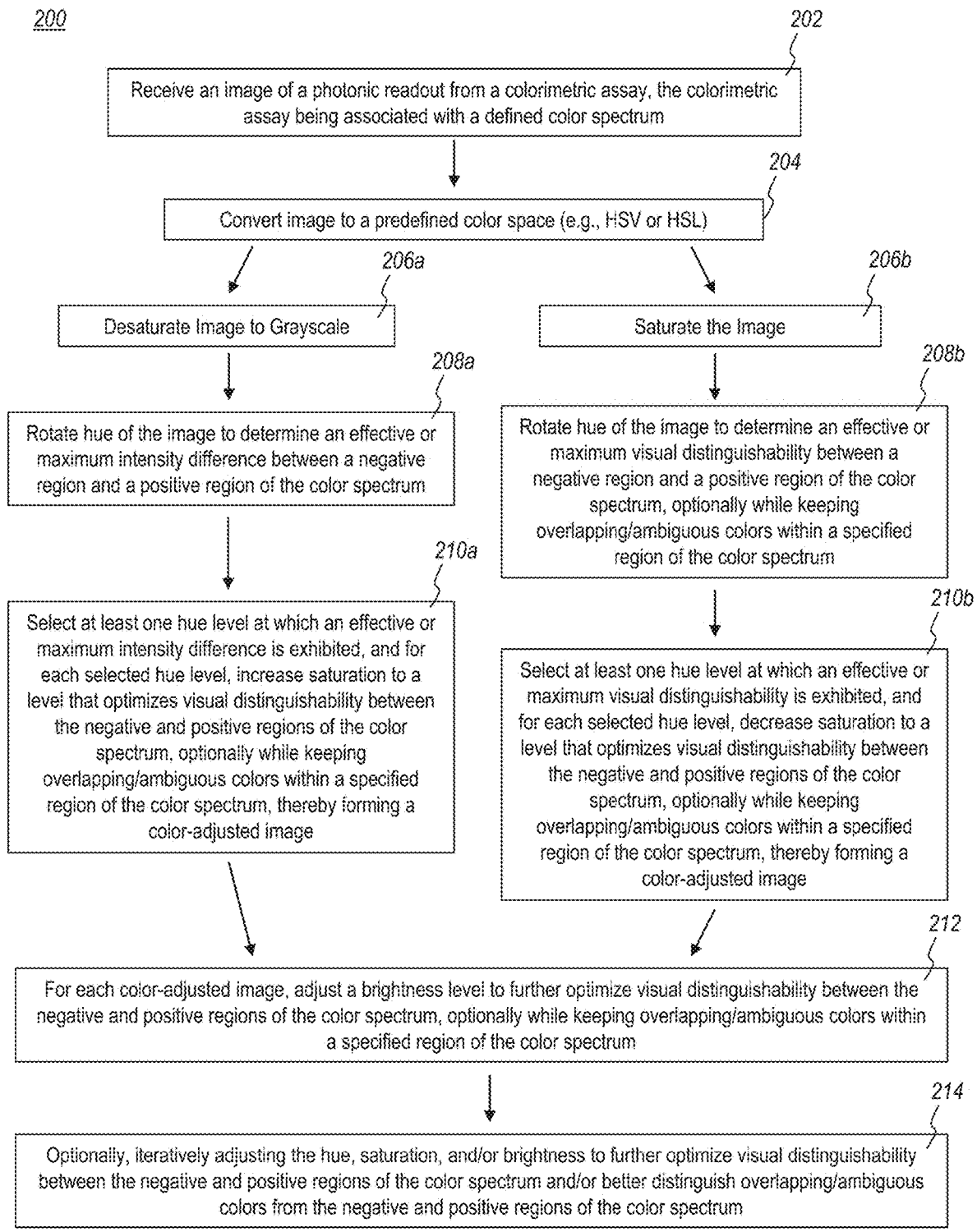
FIG. 5A is a flowchart of an example method for enhancing an image of a photonic readout from a colorimetric assay.

FIG. 5A is a flowchart 200 of an example method for enhancing an image of a photonic readout from a colorimetric assay. The method includes a step of receiving an image of a photonic readout from a colorimetric assay, the colorimetric assay being associated with a defined color spectrum (step 202). This can include, for example, a user taking a photograph or uploading a photograph of a readout using an application such as disclosed herein. The method can include preliminary image quality operations and calibrations, such as white balancing, perspective transform, and the like. In conjunction with receiving the image, the method can include receiving assay information, such as via a QR code or other scannable code on the readout, for association with the received image and/or user entered information. Such assay information can include, for example, information regarding the color spectrum specific to the assay (e.g., what colors are matched with positive and negative results), assay metadata (e.g., dates, individual/patient identifiers), and the like. The method can further convert the image to a predefined color space (step 204) such as HSV or HSL.

The method can then proceed according to a first approach that comprises desaturating the image (step 206a), and then rotating the hue of the image to determine an effective or maximum intensity difference between a negative region and a positive region of the color spectrum (step 208a). More than one candidate hue value can meet this criterion. For example, hue values that result in intensity differences above a predetermined intensity difference threshold can be selected for additional processing. Intensity can be measured according to the standard grayscale pixel intensity scale of 0 to 255.

The method can select at least one hue level at which an effective or maximum intensity difference is exhibited, and for each selected hue level, increase saturation to a level that optimizes visual distinguishability between the negative and positive regions of the color spectrum, thereby forming a color-adjusted image (step 210a). This step can optionally include keeping overlapping/ambiguous colors within a specified region of the color spectrum. That is, saturation levels that minimize the region of overlapping/ambiguous colors on the relevant color spectrum can be considered to have high visual distinguishability as that term is used herein.

Alternatively, after step 204, the method can proceed according to a second approach that comprises increasing saturation of the image (e.g., fully saturating the image) (step 206b), and then rotating the hue of the image to determine an effective or maximum visual distinguishability between a negative region and a positive region of the color spectrum (step 208b). This step can optionally include keeping overlapping/ambiguous colors within a specified region of the color spectrum. As with the first approach, more than one candidate hue value can be selected for further processing.

The method can select at least one hue level at which an effective or maximum visual distinguishability is exhibited, and for each selected hue level, decrease saturation to a level that optimizes visual distinguishability between the negative and positive regions of the color spectrum, thereby forming a color-adjusted image (step 210b). This step can again optionally include keeping overlapping/ambiguous colors within a specified region of the color spectrum.

For each color-adjusted image generated via the first approach and/or via the second approach, the method can adjust a brightness level to further optimize visual distinguishability between the negative and positive regions of the color spectrum (step 212), optionally while keeping overlapping/ambiguous colors within a specified region of the color spectrum. The method can also optionally include iteratively adjusting the hue, saturation, and/or brightness (and/or other such image parameters) to further optimize visual distinguishability between the negative and positive regions of the color spectrum and/or better distinguish overlapping/ambiguous colors from the negative and positive regions of the color spectrum (step 214).

The method can include additional processing steps such as automatic feature extraction (e.g., identification of color reference on the readout, identification of target reaction chambers on a multiplex readout). Such steps can be carried out using computer vision and image analysis techniques as known in the art. The method can include automatic color analysis and classification for reporting test results (e.g., in a simple, summary format) to the user, clinician, testing/surveillance agency, and/or other parties, such as illustrated in the example user interface of FIG. 4B.

Figure 5B:
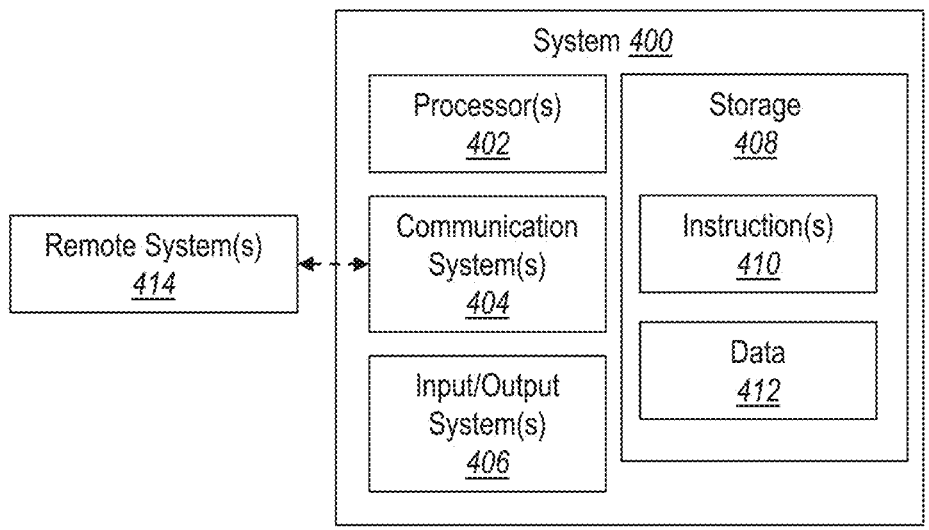
FIG. 5B schematically illustrates an example computer system that can be utilized to implement a color enhancement method as disclosed herein.

The methods disclosed herein, including the method shown in flowchart 200, can be carried out, at least in part, using a computer system such as the computer system 400 shown in FIG. 5B. The computer system 400 includes processor(s) 402, communication system(s) 404, I/O system (s) 406, and storage 408. Although FIG. 5B illustrates the computer system 400 as including particular components, it will be appreciated that the computer system 400 may comprise any number of additional or alternative components. The processor(s) 402 may comprise one or more sets of electronic circuitry that include any number of logic units, registers, and/or control units to facilitate the execution of computer-readable instructions (e.g., instructions that form a computer program). Such computer-readable instructions may be stored within storage 408. The storage 408 may comprise physical system memory or computer-readable recording media and may be volatile, non-volatile, or some combination thereof. Furthermore, storage 408 may comprise local storage, remote storage, or some combination thereof.

The processor(s) 402 may be configured to execute instructions 410 stored within storage 408 to perform certain operations associated with enhancing an image of a photonic readout. The actions may rely at least in part on data 412 (e.g., image data) stored on storage 408 in a volatile or non-volatile manner. In some instances, the actions may rely at least in part on communication system(s) 404 for receiving data from remote system(s) 414, which may include, for example, other computer systems, imaging devices/systems, and/or others.

The communications system(s) 404 may comprise any combination of software or hardware components that are operable to facilitate communication between on-system components/devices and/or with off-system components/devices. For example, the communications system(s) 404 may comprise ports, buses, or other physical connection apparatuses for communicating with other devices/components (e.g., USB port, SD card reader, and/or other apparatus). Additionally, or alternatively, the communications system(s) 404 may comprise systems/components operable to communicate wirelessly with external systems and/or devices through any suitable communication channel(s), such as, by way of non-limiting example, Bluetooth, ultra-wideband, WLAN, infrared communication, and/or others.

The actions that are executable by the processor(s) 402 may rely at least in part on I/O system(s) 406 for receiving user input from one or more users. I/O system(s) 406 may include any type of input or output device such as, by way of non-limiting example, a touch screen, a display, a mouse, a keyboard, a controller, and/or others, without limitation. In certain embodiments, the user interfaces, or components thereof, shown and described in relation to FIGS. 1A-4C can be included in the I/O system(s) 406.

WORKING EXAMPLES

In the following working examples, H represents hue, S represents saturation, and V represents Value. In these examples, the hue value can be any number in the range of 0 to 2, corresponding to 0 to 360 degrees of rotation around the RGB color circle. The saturation can be any number in the range of −1 to 3 corresponding to 100% of desaturation to 300% of saturation. The value can be any number in the range of −0.5 to 1.5 corresponding to various levels of brightness adjustment. Other scaling of HSV values may be used in other examples depending on specific application and algorithm implementation.

Approach 1

Figure 6:
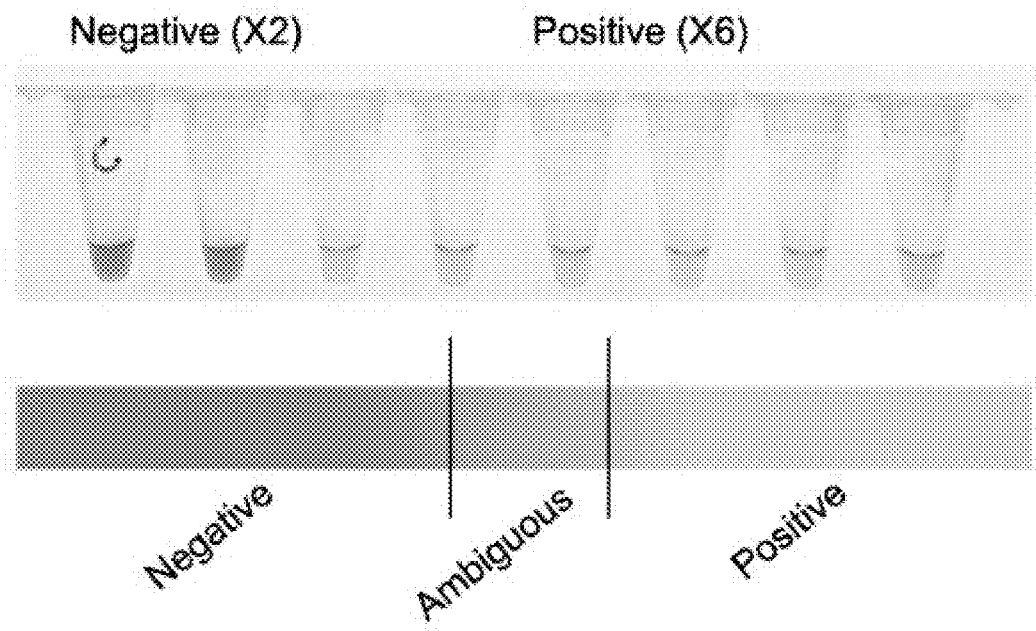
FIG. 6 shows the results of an example colorimetric assay based on pH-dependent reverse-transcription loop-mediated isothermal amplification of nucleic acid and corresponding color spectrum of potential test results including negative, positive, and the region of overlapping/ambiguous colors therebetween.
Figure 7A:
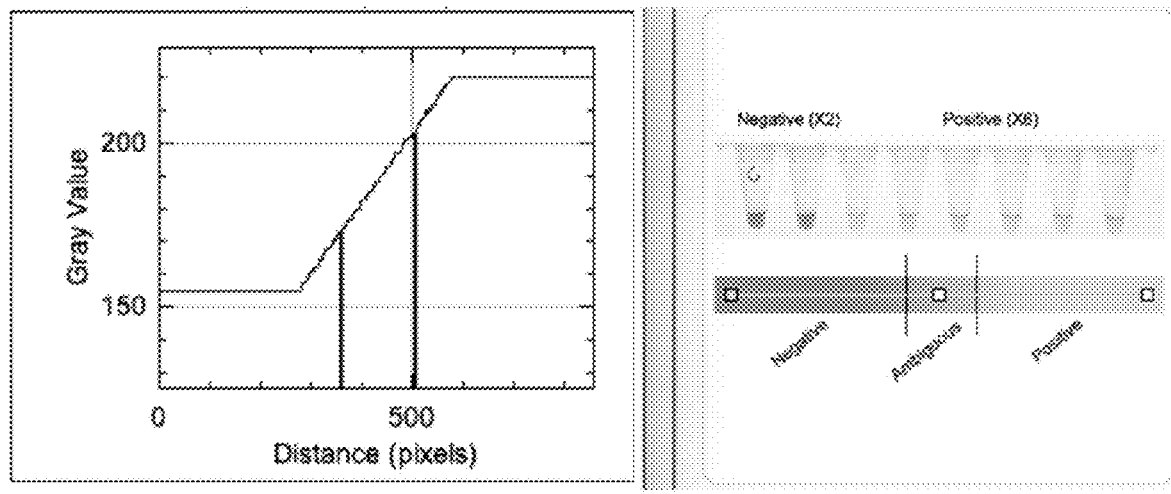
FIGS. 7A-7H show desaturation of the original readout image from FIG. 6 and gradual rotation of hue in the HSV color space to determine an intensity difference between the negative and positive readout regions on the color spectrum of the assay from which the readout was generated.
Figure 7B:
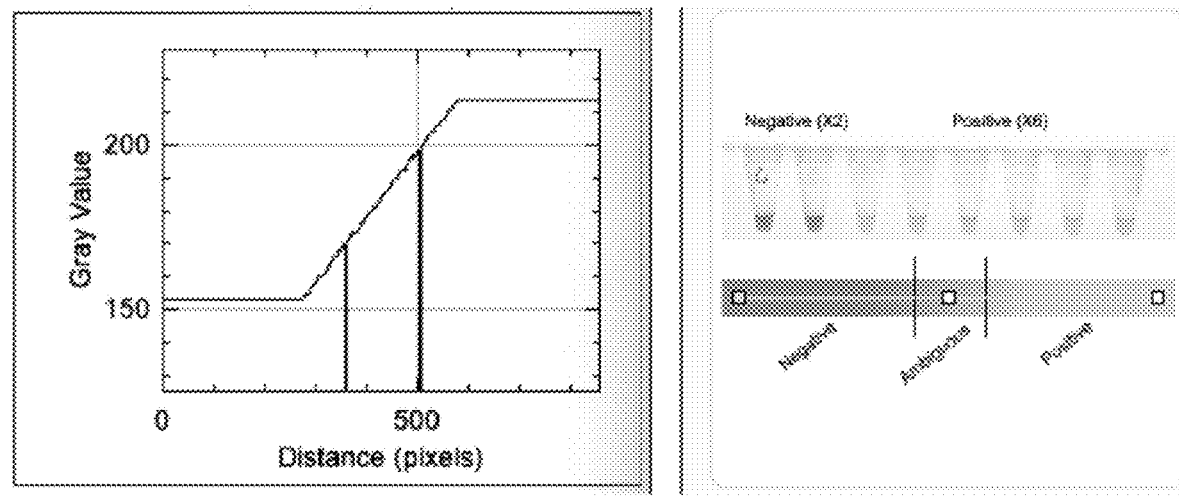
Figure 7C:
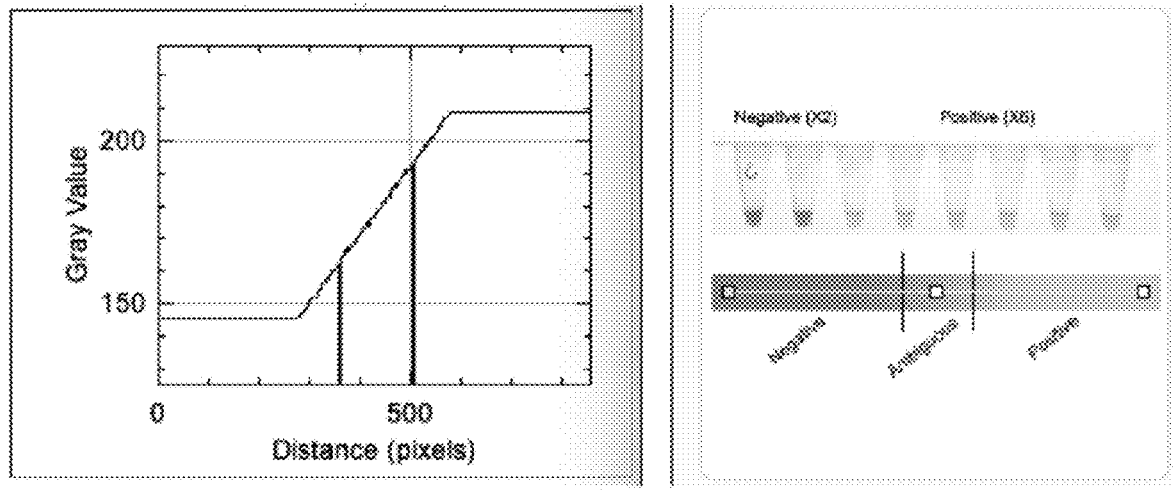
Figure 7D:
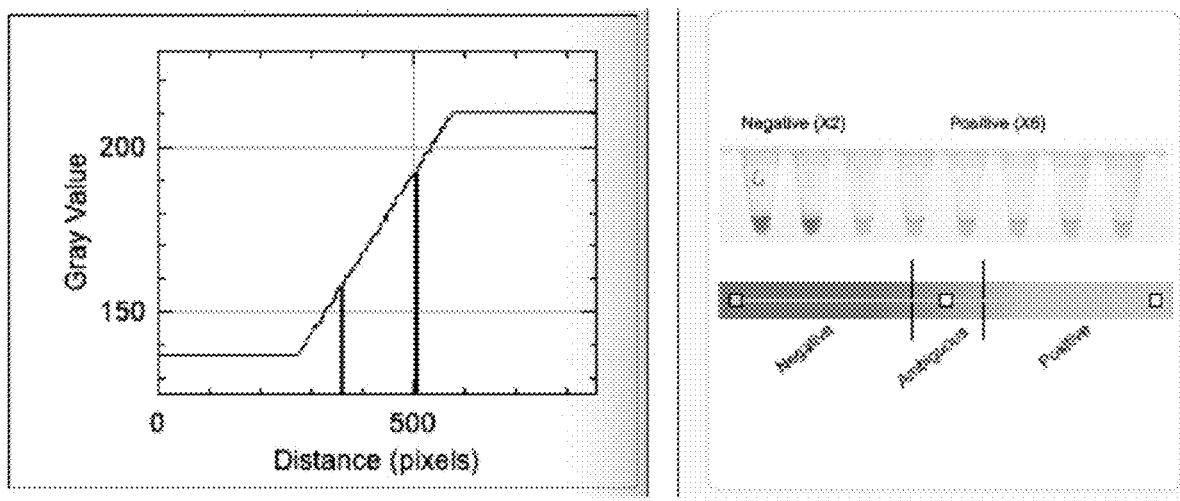
Figure 7E:
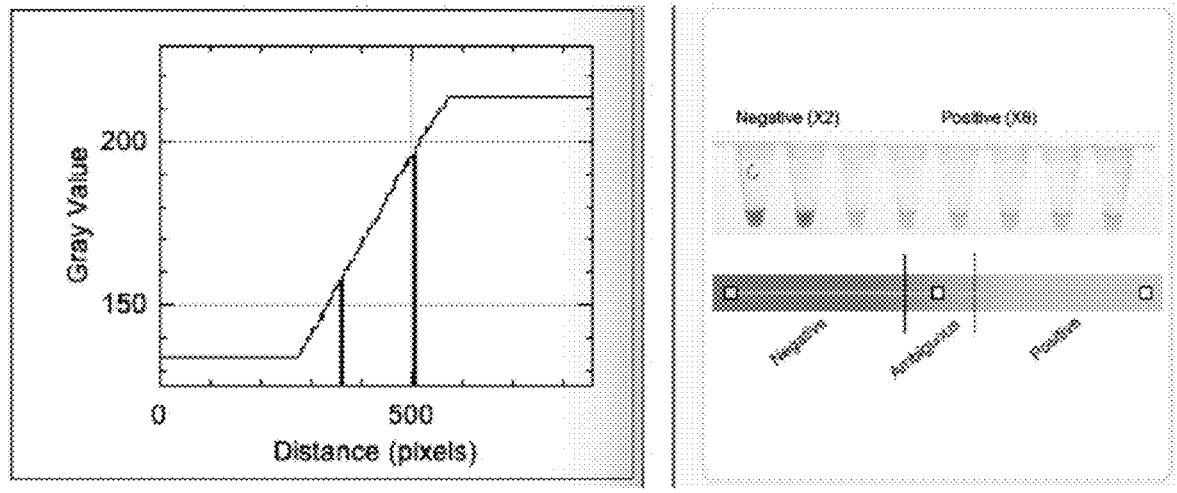
Figure 7F:
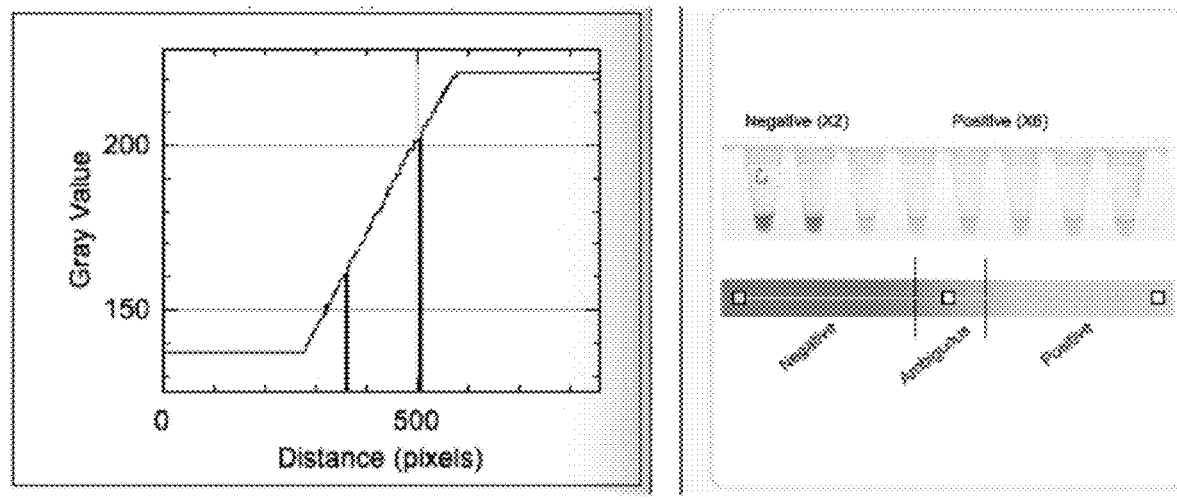
Figure 7G:
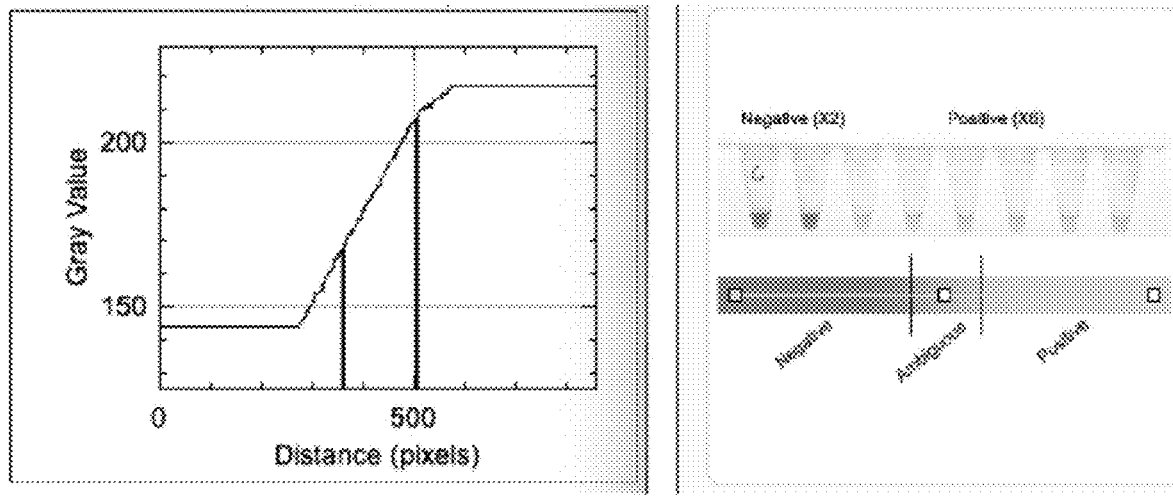
Figure 7H:
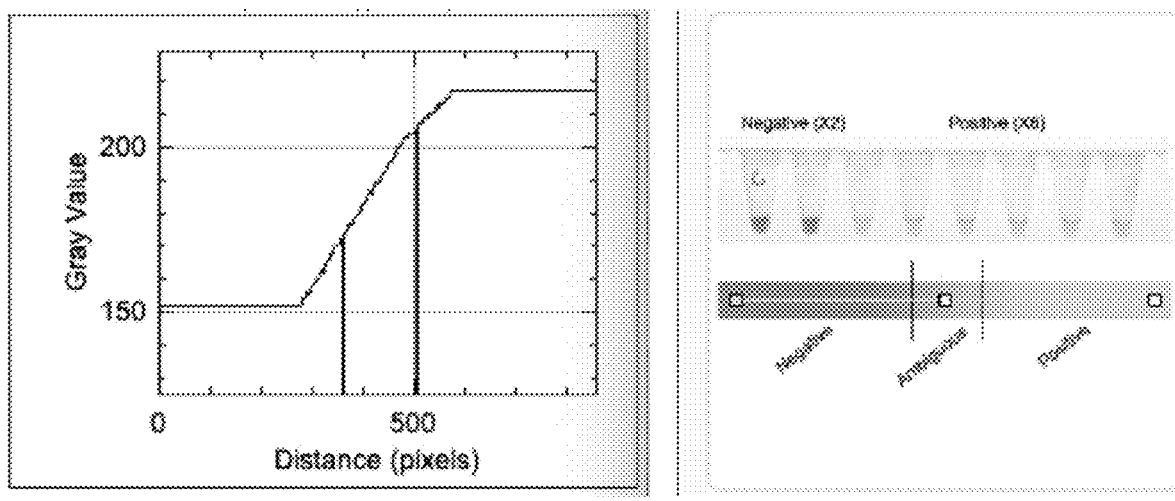

FIG. 6 shows the results of an example colorimetric assay based on pH-dependent reverse-transcription loop-mediated isothermal amplification of nucleic acid. With this particular assay formulation, the reaction changes color from pink to yellow upon detection of the target analyte. Expected colors of the true negative and true positives reactions are shown in the PCR tubes. FIG. 6 also shows the corresponding color spectrum of potential test results including negative, positive, and the region of overlapping/ambiguous colors in between.

FIGS. 7A-7H show desaturation of the original readout image from FIG. 6 and gradual rotation of the hue in the HSV color space to determine intensity difference between the negative and positive readout regions on the color spectrum of the assay from which the FIG. 6 readout was generated. For each of several hue values, an intensity profile is computed along the line drawn on the color spectrum, with intensity values (0 to 255) indicated on the vertical axis. Here, the 1.00 and 1.25 hue values achieved an effective intensity difference between negative and positive regions of the color spectrum. Because the 1.25 hue value exhibited the highest intensity difference (222-137-85), it was used for the following steps.

Figure 8A:
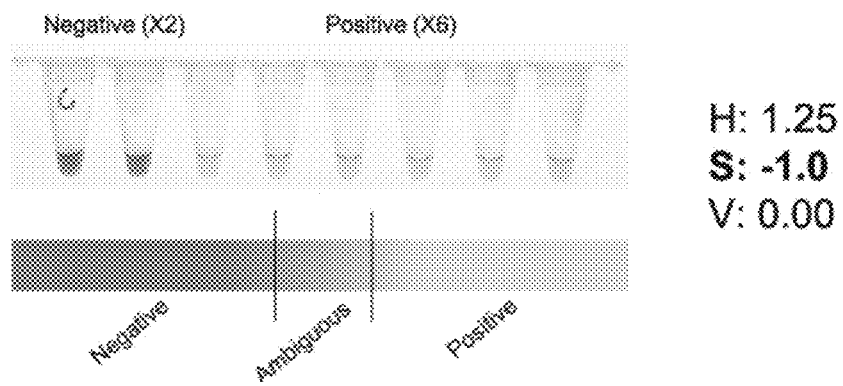
FIGS. 8A-8I show a gradual increase in saturation following image desaturation and hue rotation of the colorimetric readout image.
Figure 8B:
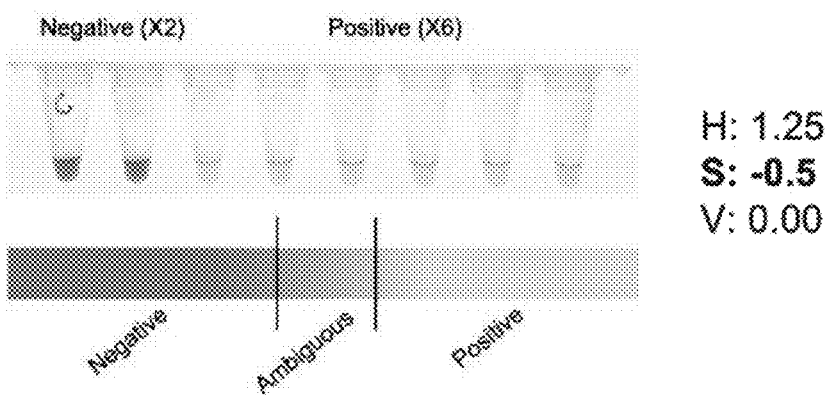
Figure 8C:
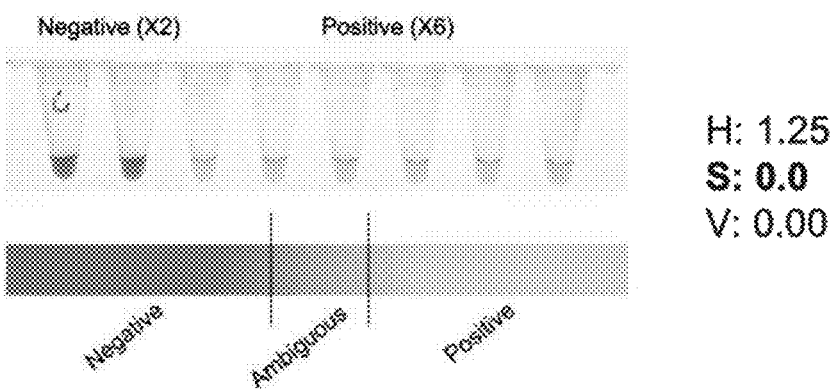
Figure 8D:
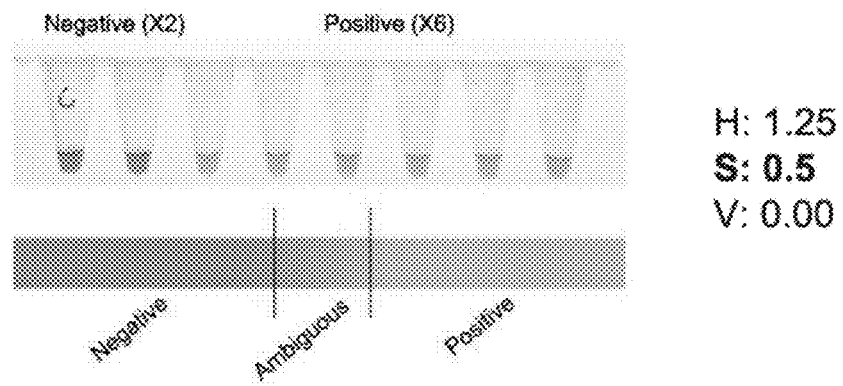
Figure 8E:
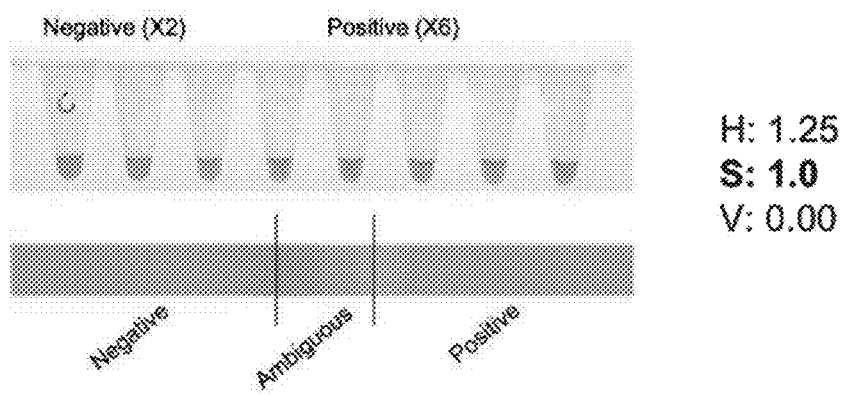
Figure 8F:
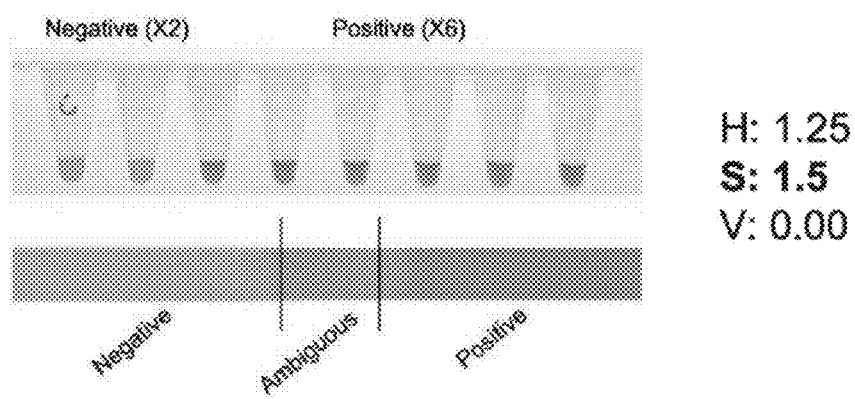
Figure 8G:
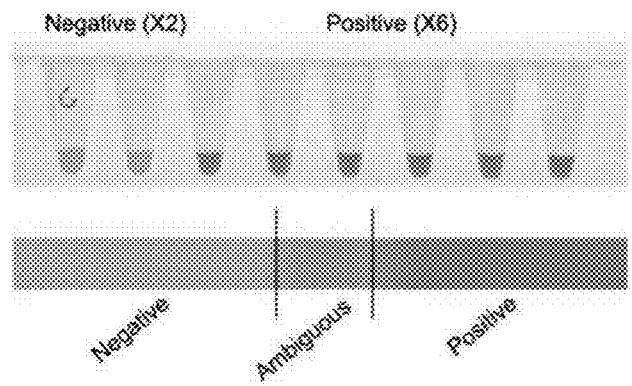
Figure 8H:
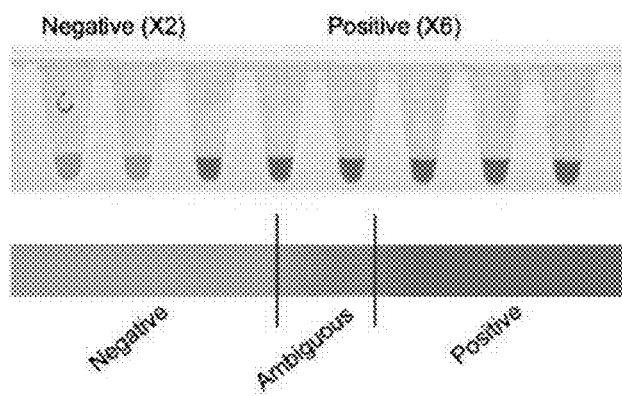
Figure 8I:
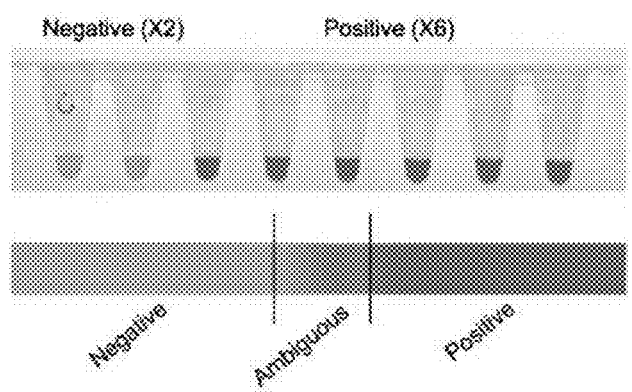
Figure 9A:
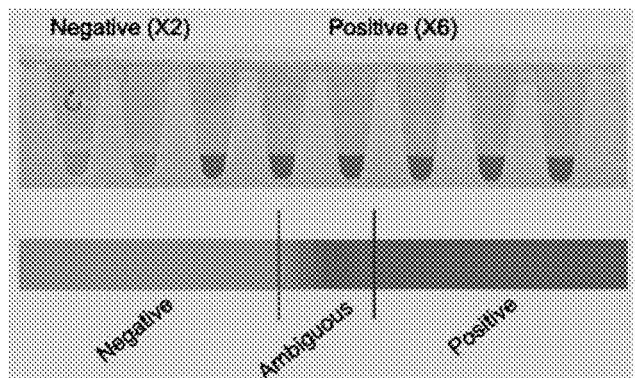
FIGS. 9A-9F show gradual adjustment of brightness to further enhance the colorimetric readout image following adjustment of hue and saturation.
Figure 9B:
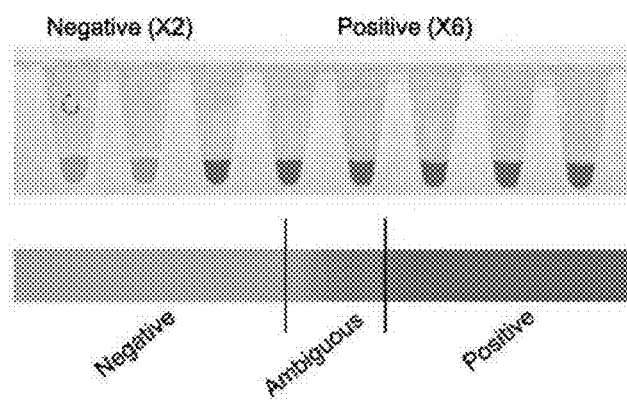
Figure 9C:
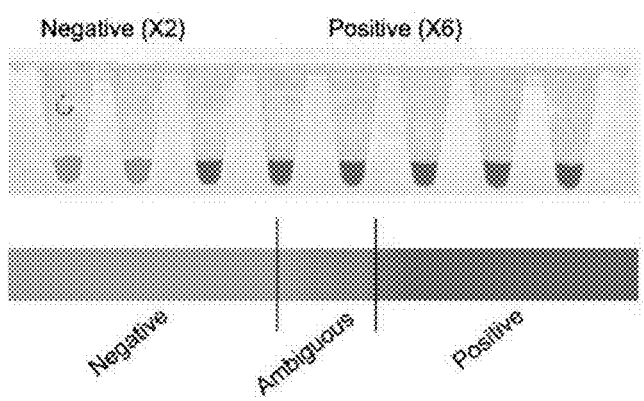
Figure 9D:
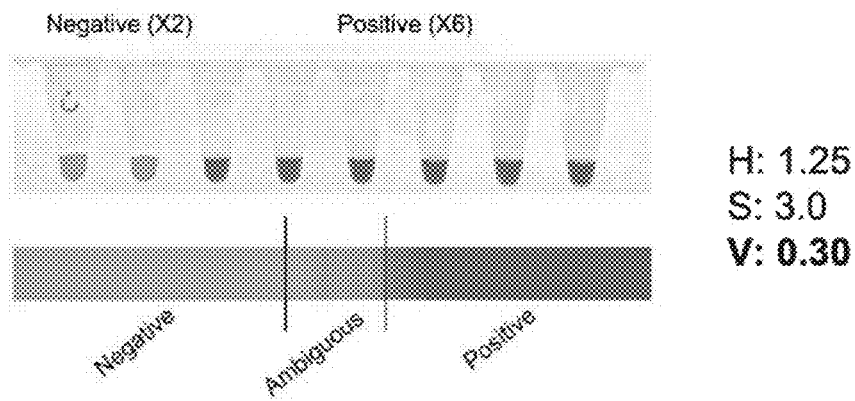
Figure 9E:
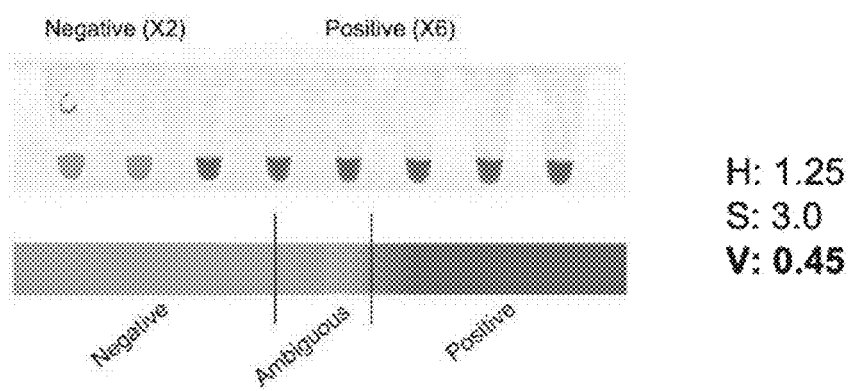
Figure 9F:
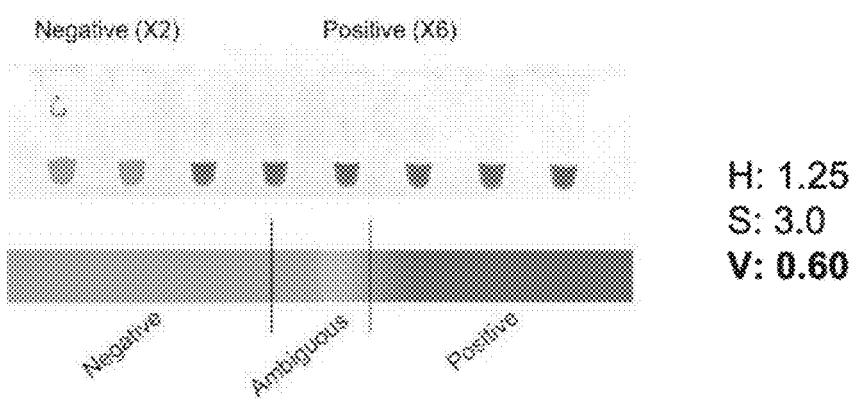

FIGS. 8A-8I show a gradual increase in saturation following image desaturation and hue rotation. The saturation value can affect the visual contrast between the negative and positive readouts as well as the ambiguous region. An effective saturation enhancement achieves good visual contrast between the positive and negative regions while keeping ambiguous colors within the specific region defined on the corresponding color spectrum. In this example, the saturation values 2.0, 2.5, and 3.0, as shown in FIGS. 8G-8I, achieved effective enhancement. A saturation value of 3.0 was selected for the following steps.

FIGS. 9A-9F show gradual adjustment of image brightness to further enhance the colorimetric readout images following adjustment of hue and saturation. The brightness value can affect the visual contrast between the negative and positive readouts as well as the ambiguous region. An effective brightness enhancement good visual contrast between the positive and negative regions while keeping any ambiguous colors within the specific region defined on the corresponding color spectrum. In this example, values 0.00, 0.15, and 0.30, corresponding to FIGS. 9B-9D, achieved effective enhancement.

Approach 2

Figure 10:
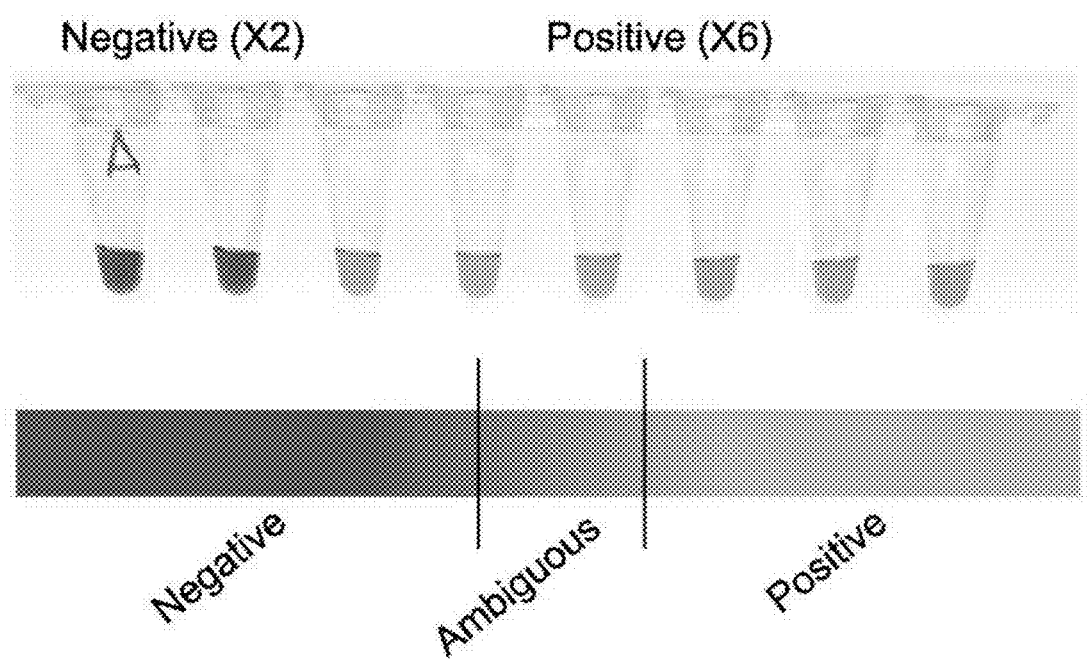
FIG. 10 shows the results of an example colorimetric test based on pH-independent reverse-transcription loop-mediated isothermal amplification of nucleic acid and corresponding color spectrum of potential test results including negative, positive, and the region of overlapping/ambiguous colors therebetween.
Figure 11A:
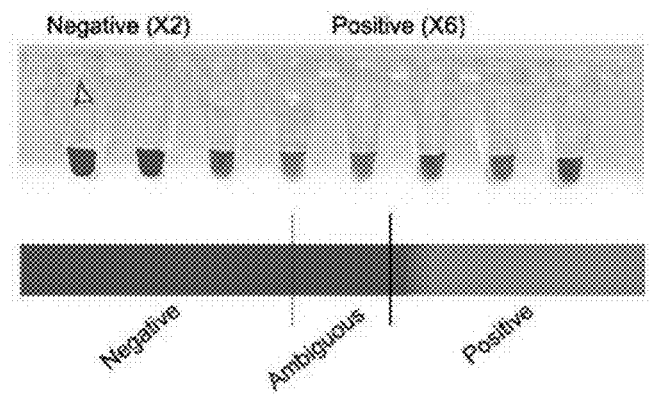
FIGS. 11A-11H show saturation of the original readout image from FIG. 10 and gradual rotation of hue in the HSV color space to enhance a visually distinguishable color difference between the negative and positive readout regions while minimizing overlapping or ambiguous colors on the color spectrum specific to the assay.
Figure 11B:
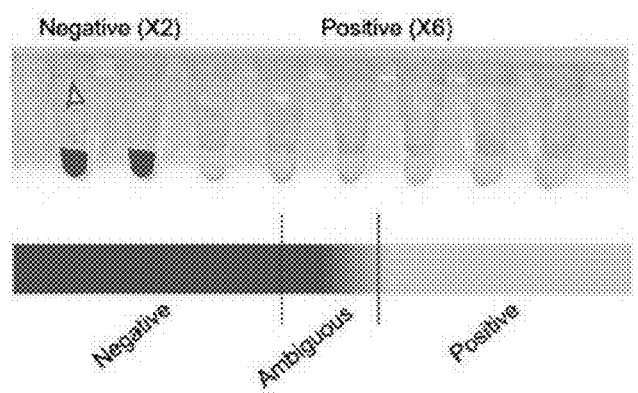
Figure 11C:
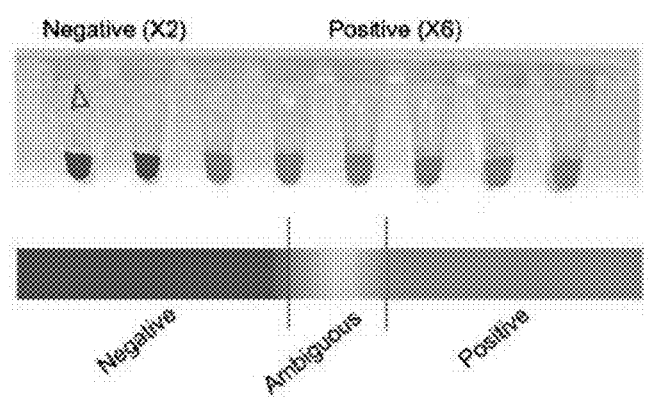
Figure 11D:
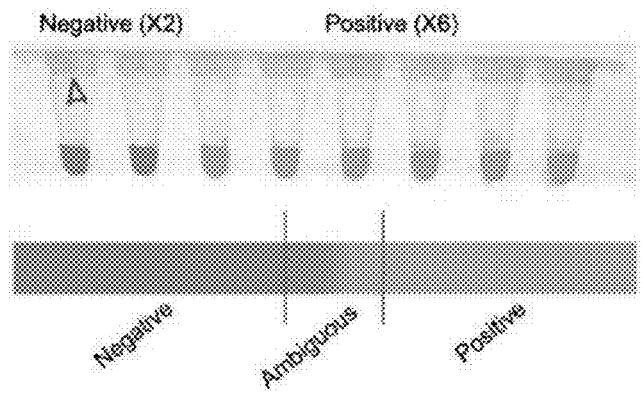
Figure 11E:
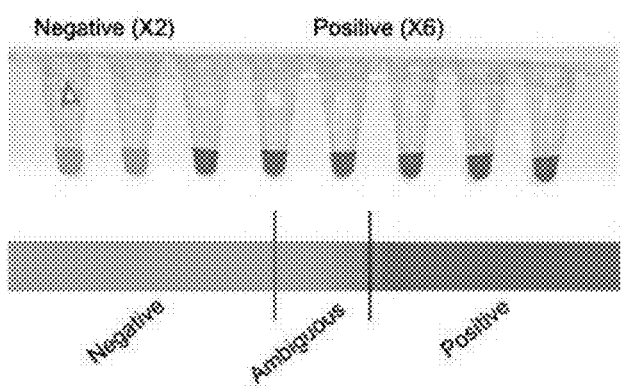
Figure 11F:
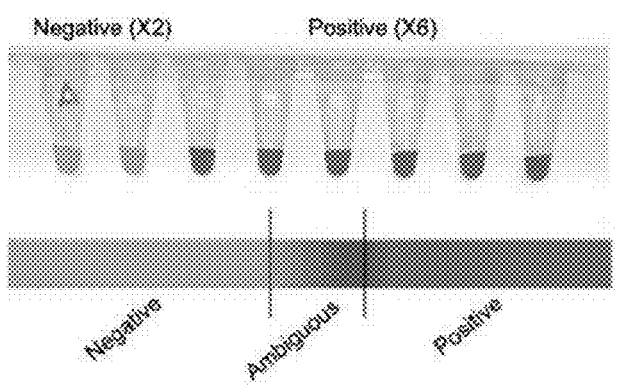
Figure 11G:
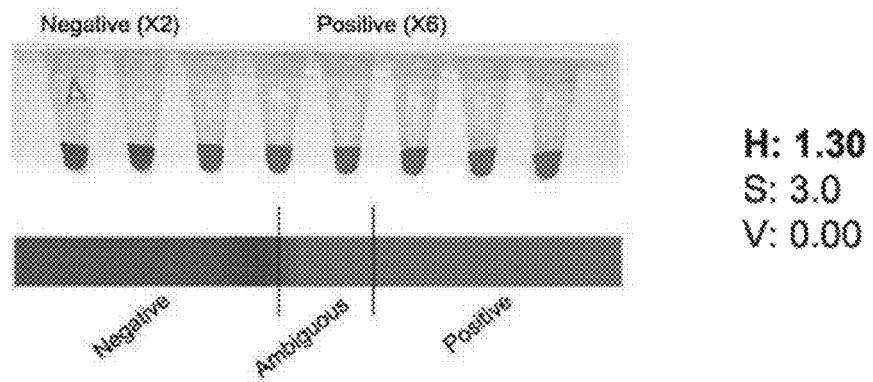
Figure 11H:
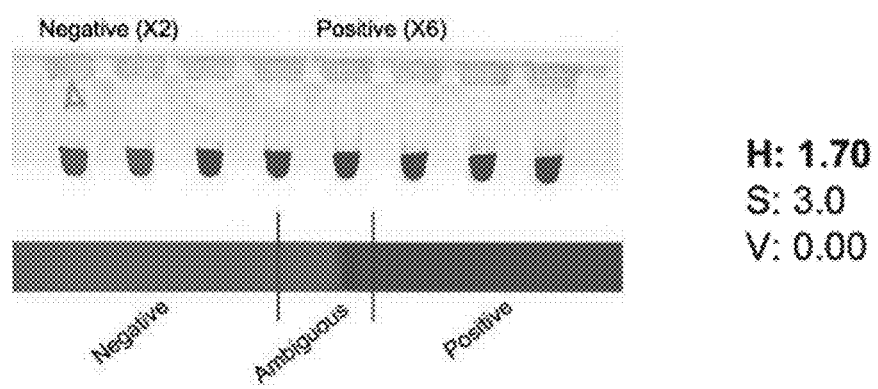

FIG. 10 shows the results of an example colorimetric test based on pH-independent reverse-transcription loop-mediated isothermal amplification of nucleic acid. With this particular assay formulation, the reaction changes color from red to golden upon detection of the target analyte. Expected colors of the true negative and true positives reactions are shown in the PCR tubes. FIG. 10 also shows the corresponding color spectrum of potential test results including negative, positive, and the region of overlapping/ambiguous colors in between.

FIGS. 11A-11H show saturation of the original readout image from FIG. 10 and gradual rotation of the hue in the HSV color space to enhance visually distinguishable color difference between the negative and positive readout regions while minimizing overlapping or ambiguous colors on the color spectrum specific to the assay. In this example, the hue values in FIGS. 11B, 11C, 11F, and 11G exhibited effective visual distinguishability and represent good candidates for further processing. The images with hue values of 0.10 (FIG. 11B) and 0.20 (FIG. 11C) were selected for further processing.

Figure 12A:
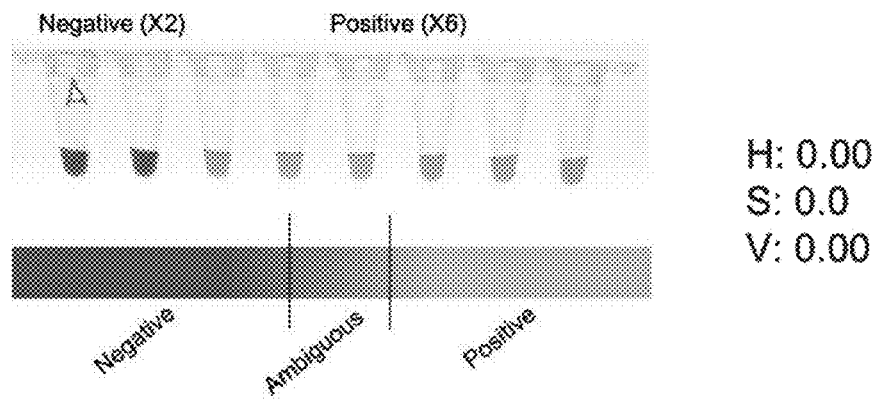
FIGS. 12A-12C show further color enhancement following hue optimization, resulting in a binary readout (i.e., negative, positive).
Figure 12B:
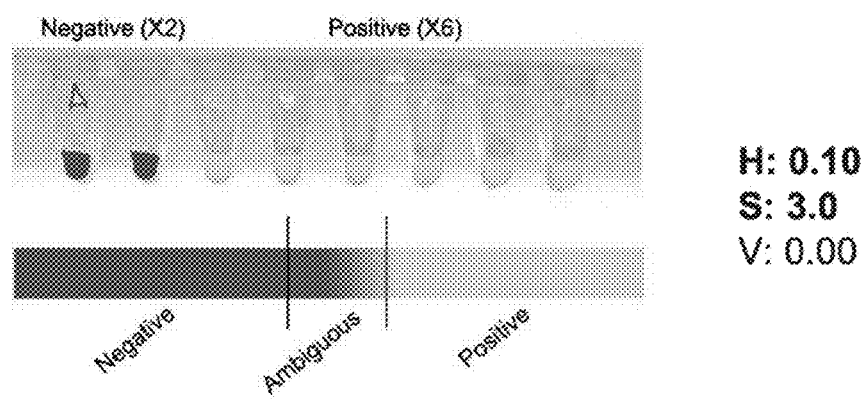
Figure 12C:
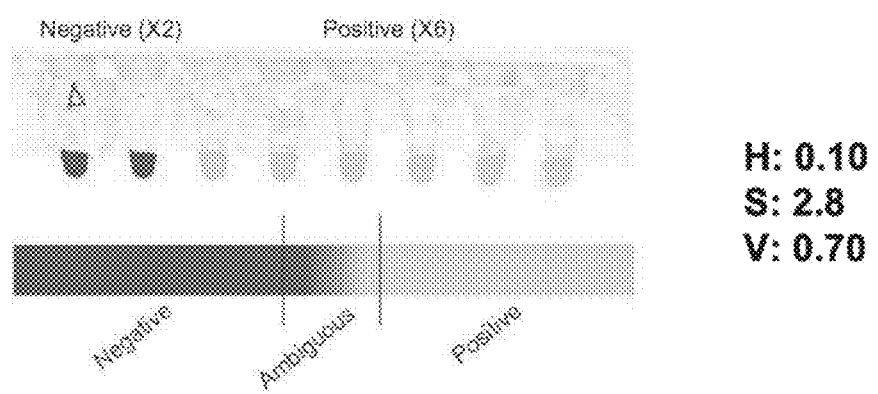

FIGS. 12A-12C show further color enhancement following hue optimization, resulting in a binary readout (i.e., negative, positive). FIG. 12A is the original test image from FIG. 10 and its corresponding color spectrum, FIG. 12B is the image following saturation and hue optimization to an effective candidate value (H=0.10), and FIG. 12C is the image following further enhancement by brightness adjustment and fine-tuning of saturation (note that saturation is slightly reduced from the previous 3.0 value). In this example, brightness optimization helps to ensure ambiguous colors are restricted/minimized within the region specified on the color spectrum.

Figure 13A:
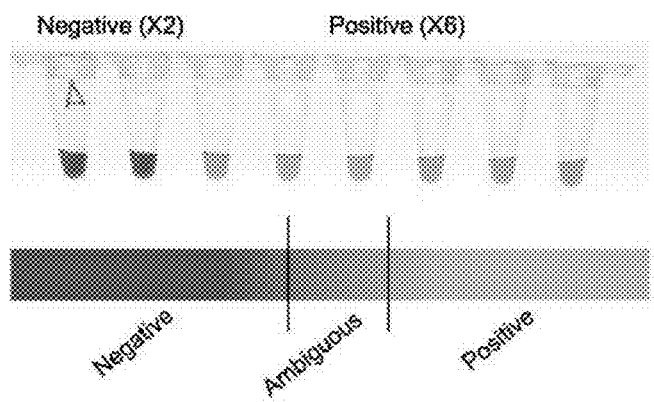
FIGS. 13A-13C show further color enhancement following hue optimization, resulting in a trinary readout (i.e., negative, positive, ambiguous).
Figure 13B:
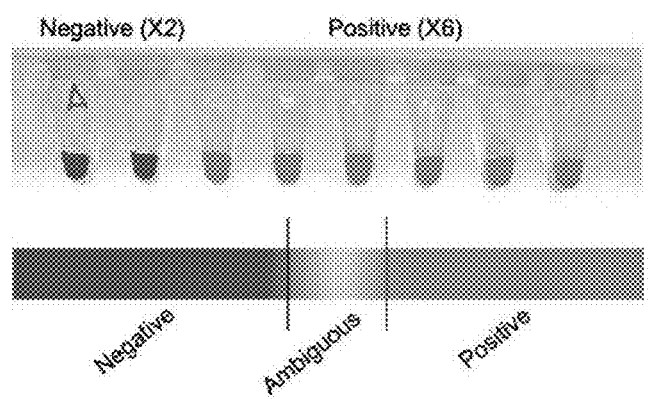
Figure 13C:
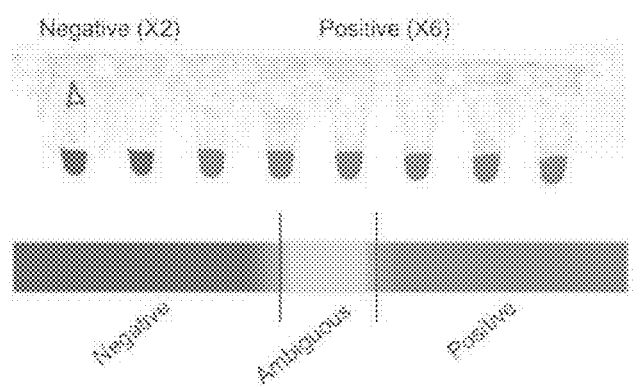

FIGS. 13A-13C show further color enhancement following hue optimization, resulting in a trinary readout (i.e., negative, positive, ambiguous). FIG. 13A is the original test image from FIG. 10 and its corresponding color spectrum, FIG. 13B is the image following saturation and hue optimization to an effective candidate value (H=0.20), and FIG. 13C is the image following further enhancement by brightness adjustment. In this example, brightness optimization helps to ensure ambiguous colors are restricted/minimized within the region specified on the color spectrum and also results in three distinct colors for the three possible readouts (negative, ambiguous, positive). Identification of ambiguous readouts from true positive and true negative readouts can be beneficial, for example, by serving as a quality control for the test.

Hypothetical Color Spectrum in an Alternative Color Space

Figure 14A:
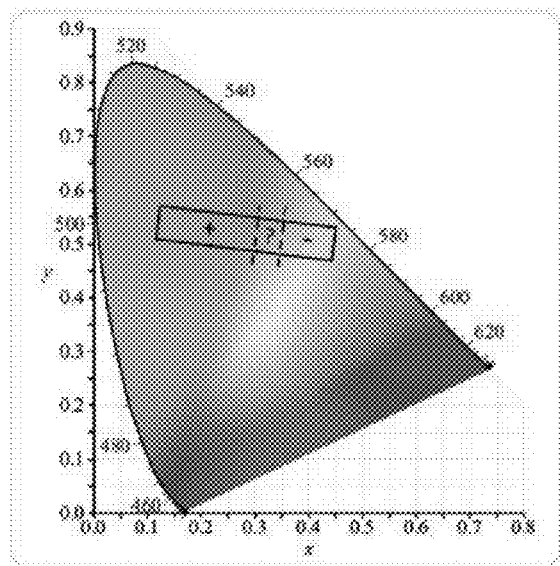
FIGS. 14A-14F illustrate color enhancements of binary (negative, positive) or trinary (negative, positive, ambiguous) readouts on a hypothetical color spectrum overlayed on the CIE 1931 color space.
Figure 14B:
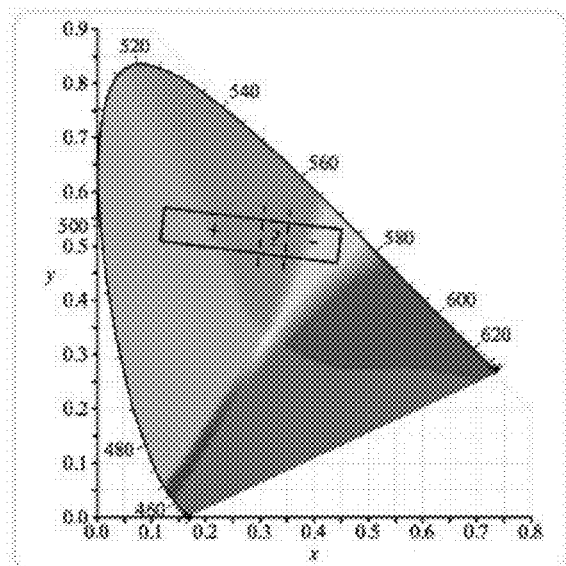
Figure 14C:
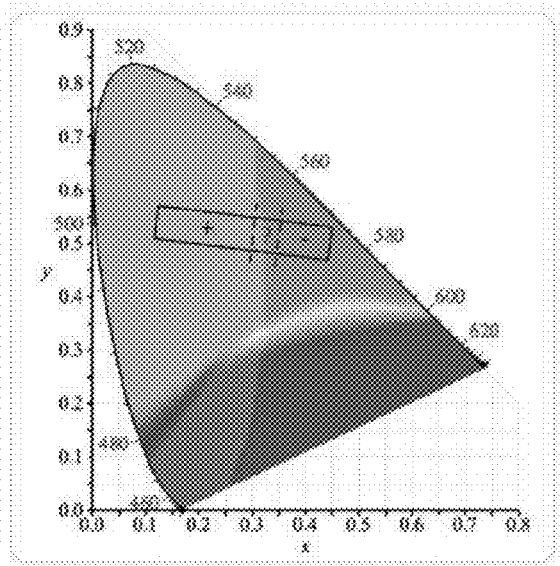
Figure 14D:
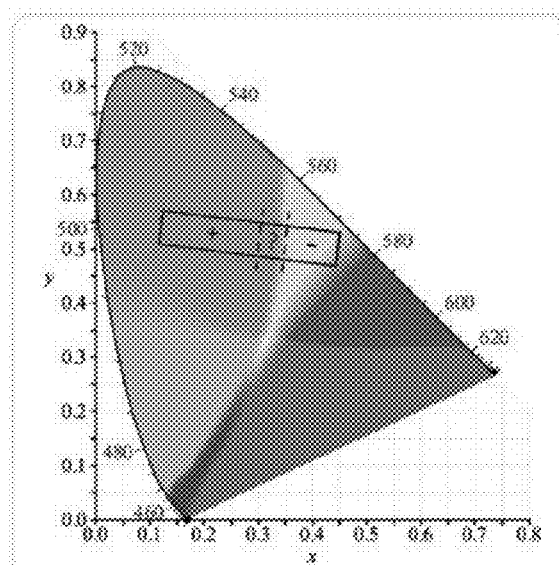
Figure 14E:
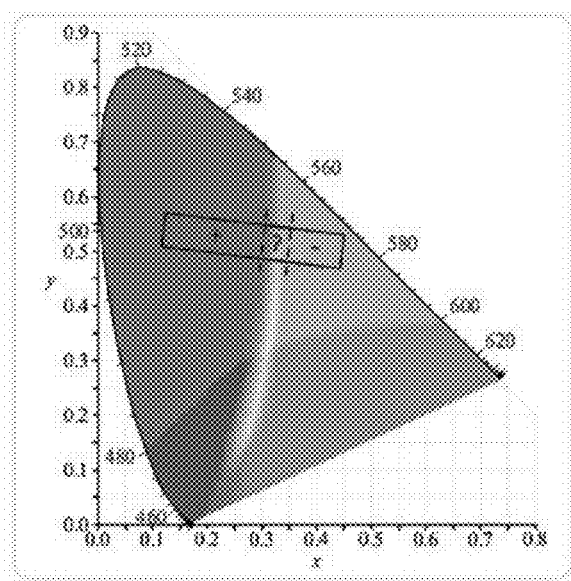
Figure 14F:
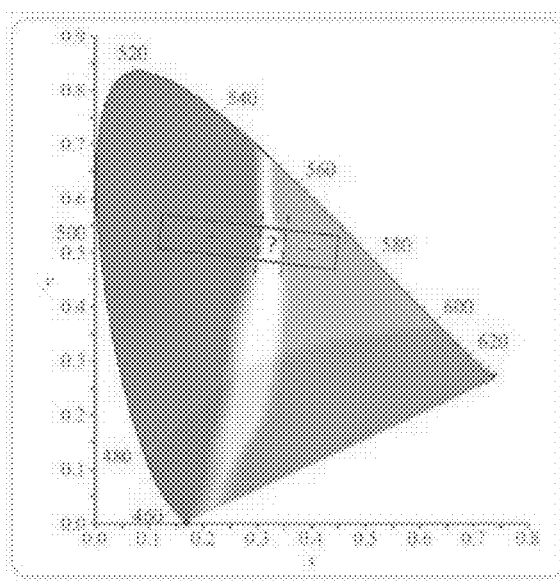

FIGS. 14A-14F illustrate color enhancements of binary (negative, positive) or trinary (negative, positive, ambiguous) readouts on a hypothetical color spectrum overlayed on the CIE 1931 color space. FIG. 14A shows the original color spectrum with its original readout colors. FIGS. 14B-14E show the color spectrum after applying saturation and various degrees of hue rotation (i.e., following a method according to approach 2). In this example, FIGS. 14D and 14E achieve enhanced binary readouts. Following further adjustment of brightness and fine-tuning of saturation, FIG. 14F achieved an effective trinary readout. This example illustrates the applicability of the disclosed system and method across a variety of color spaces.

Enhancing Previously Generated Colorimetric Readouts

FIGS. 15A-15C illustrate enhancement of previously generated colorimetric readout images. The illustrated readout relates to detection of multiple biomarkers from an example urine test published in literature. FIG. 15A is the original test image as published, and FIGS. 15B and 15C illustrate color-enhanced images with two different color enhancement settings achieved using the disclosed method. As compared to the original test image of FIG. 15A, the enhanced images of FIGS. 15B and 15C indicate the biomarkers significantly more clearly.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

The various features of a given embodiment can be combined with and/or incorporated into other embodiments disclosed herein. Thus, disclosure of certain features relative to a specific embodiment of the present disclosure should not be construed as limiting application or inclusion of said features to the specific embodiment. Rather, it will be appreciated that other embodiments can also include such features.

In addition, unless otherwise indicated, numbers expressing quantities, constituents, distances, or other measurements used in the specification and claims are to be understood as optionally being modified by the term "about." When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

The embodiments disclosed herein should be understood as comprising/including disclosed components and features, and may therefore include additional components and features not specifically described. Optionally, the embodiments disclosed herein can omit components or features that are not specifically described. For example, image analysis techniques and/or color adjustment operations that are not specifically disclosed herein may optionally be expressly omitted.

REFERENCES (1) Woolf, M. S.; Dignan, L. M.; Scott, A. T.; Landers, J. P. Digital Postprocessing and Image Segmentation for Objective Analysis of Colorimetric Reactions. *Nat. Protoc.* 2021, 16 (1), 218-238. https://doi.org/10.1038/s41596-020-00413-0.

(2) Song, X.; Coulter, F. J.; Yang, M.; Smith, J. L.; Tafesse, F. G.; Messer, W. B.; Reif, J. H. A Lyophilized Colorimetric RT-LAMP Test Kit for Rapid, Low-Cost, at-Home Molecular Testing of SARS-COV-2 and Other Pathogens. *Sci. Rep.* 2022, 12 (1), 7043. https://doi.org/10.1038/s41598-022-11144-5.

(3) Yeasmin, S.; Ammanath, G.; Ali, Y.; Bochm, B. O.; Yildiz, U. H.; Palaniappan, A.; Liedberg, B. Colorimetric Urinalysis for On-Site Detection of Metabolic Biomarkers. *ACS Appl. Mater. Interfaces* 2020, 12 (28), 31270-31281. https://doi.org/10.1021/acsami.0c09179.

(4) Hagström, A. E. V.; Garvey, G.; Paterson, A. S.; Dhamane, S.; Adhikari, M.; Estes, M. K.; Strych, U.; Kourentzi, K.; Atmar, R. L.; Willson, R. C. Sensitive Detection of Norovirus Using Phage Nanoparticle Reporters in Lateral-Flow Assay. *PLOS ONE* 2015, 10 (5), c0126571. https://doi.org/10.1371/journal.pone.0126571.

(5) Yedire, S. G.; Khan, H.; AbdelFatah, T.; Siavash Moakhar, R.; Mahshid, S. Microfluidic-Based Colorimetric Nucleic Acid Detection of Pathogens. *Sens. Diagn.* 2023, 10.1039.D2SD00186A. https://doi.org/10.1039/D2SD00186A.

(6) Rodriguez-Manzano, J.; Karymov, M. A.; Begolo, S.; Selck, D. A.; Zhukov, D. V.; Juc, E.; Ismagilov, R. F. Reading Out Single-Molecule Digital RNA and DNA Isothermal Amplification in Nanoliter Volumes with Unmodified Camera Phones. *ACS Nano* 2016, 10 (3), 3102-3113. https://doi.org/10.1021/acsnano.5b07338.

(7) Aoki, M. N.; De Oliveira Coelho, B.; Gócs, L. G. B.; Minoprio, P.; Durigon, E. L.; Morello, L. G.; Marchini, F. K.; Ricdiger, I. N.; Do Carmo Debur, M.; Nakaya, H. I.; Blanes, L. Colorimetric RT-LAMP SARS-COV-2 Diagnostic Sensitivity Relies on Color Interpretation and Viral *Sci. Rep.* 2021, 11 (1), 9026. Load. https://doi.org/10.1038/s41598-021-88506-y.

(8) Yetisen, A. K.; Martincz-Hurtado, J. L.; Garcia-Melendrez, A.; Da Cruz Vasconcellos, F.; Lowe, C. R. A Smartphone Algorithm with Inter-Phone Repeatability for the Analysis of Colorimetric Tests. *Sens. Actuators B Chem.* 2014, 196, 156-160. https://doi.org/10.1016/j.snb.2014.01.077.

(9) Hira, S.; Matsumoto, A.; Kihara, K.; Ohtsuka, S. Huc Rotation (HR) and Hue Blending (HB): Real-Time Image Enhancement Methods for Digital Component Video Signals to Support Red-Green Color-Defective Observers. *J. Soc. Inf. Disp.* 2019, 27 (7), 409-426. https://doi.org/10.1002/jsid.758.

(10) Huang, J.-B.; Chen, C.-S.; Jen, T.-C.; Wang, S.-J. Image Recolorization for the Colorblind. In 2009 *IEEE International Conference on Acoustics, Speech and Signal Processing*; IEEE: Taipei, Taiwan, 2009; pp 1161-1164. https://doi.org/10.1109/ICASSP.2009.4959795.

(11) Kellner, M. J.; Ross, J. J.; Schnabl, J.; Dekens, M. P. S.; Matl, M.; Heinen, R.; Grishkovskaya, I.; Bauer, B.; Stadlmann, J.; Menéndez-Arias, L.; Straw, A. D.; Fritsche-Polanz, R.; Traugott, M.; Seitz, T.; Zoufaly, A.; Födinger, M.; Wenisch, C.; Zuber, J.; Pauli, A.; Brennecke, J. A Rapid, Highly Sensitive and Open-Access SARS-COV-2 Detection Assay for Laboratory and Home Testing. *Front. Mol. Biosci.* 2022, 9.

The invention claimed is:

1. A computer-implemented method for enhancing the visualization, classification, and/or interpretation of a photonic readout of a colorimetric assay, the colorimetric assay being associated with a defined color spectrum, the method comprising:
   (A) receiving an image of the photonic readout;
   (B) converting the image to a predefined color space;
   (C) enhancing image saturation and hue by
      (a1) desaturating the image;
      (b1) rotating hue of the image to determine an effective or maximum intensity difference between a negative region and a positive region of the color spectrum of the colorimetric assay; and
      (c1) selecting at least one hue level at which an effective or maximum intensity difference is exhibited, and for each selected hue level, increasing saturation to a level that increases visual contrast between the negative and positive regions of the color spectrum, thereby forming a color-adjusted image; or by
      (a2) saturating the image;
      (b2) rotating hue of the image to determine an effective or maximum visual contrast between a negative region and a positive region of the color spectrum of the colorimetric assay; and
      (c2) selecting at least one hue level at which an effective or maximum visual contrast is exhibited, and for each selected hue level, decreasing saturation to a level that increases visual contrast between the negative and positive regions of the color spectrum, thereby forming a color-adjusted image;
   (D) for each color-adjusted image, adjusting a brightness level to further increase visual contrast between the negative and positive regions of the color spectrum, and
   (E) optionally, iteratively adjusting one or more image parameters to further increase visual contrast between the negative and positive regions of the color spectrum.

2. The method of claim 1, wherein the color spectrum of the photonic readout includes colors within the visible spectrum.

3. The method of claim 1, wherein the colorimetric assay from which the photonic readout is generated comprises one or more chemical and/or biochemical processes, reactions, or protocols that provide results via a colorimetric, chromogenic, fluorescent, bioluminescent, chemiluminescent, phosphorescent, infrared, electrochemical, and/or nanoparticle-based readout.

4. The method of claim 3, wherein the colorimetric assay from which the photonic readout is generated comprises a nucleic acid amplification reaction comprising one or more of LAMP, RT-LAMP, DAMP, CPA, SDA, RCA, RPA, HDA, NASBA, MDA, WGA, GEAR, EXPAR, NEAR, SPIA, ICAN, PHAMP, SMART, BAD AMP, CRISDA, HCR, CHA, EHA, EDC, TMSD, PCR, RT-PCR, qPCR, RT-qPCR, or combination thereof.

5. The method of claim 1, wherein the predefined color space is a Hue-Saturation-Value (HSV), Hue-Saturation-Lightness (HSL), or CIE 1931 color space.

6. The method of claim 1, wherein receiving an image of the photonic readout comprises capturing the image using an electronic image device.

7. The method of claim 1, further comprising receiving color calibration data from a test device from which the photonic readout is generated, and using the color calibration data to correct for color deviations caused by variations in image acquisition parameters.

8. The method of claim 1, further comprising generating and displaying a user interface, the user interface comprising an image display area and a color enhancement control area that includes selectable objects that enable user adjustment of at least hue, saturation, and brightness, optionally wherein the user interface further comprises one or more selectable objects that enable selection of preset color enhancements.

9. The method of claim 1, further comprising determining a test result for one or more targets shown on the photonic readout and generating and displaying a user interface that includes a test results summary.

10. The method of claim 1, wherein the colorimetric assay is a multiplex assay that tests for multiple targets and wherein the photonic readout includes multiple colorimetric indicators each corresponding respectively to a target of the assay.

11. The method of claim 1, wherein the photonic readout comprises a color reference indicating colors corresponding to at least a positive result and a negative result.

12. The method of claim 1, wherein:
in (b1), determining an effective or maximum intensity difference between a negative region and a positive region of the color spectrum of the colorimetric assay comprises displaying multiple images each with different intensity differences and receiving user input indicating one or more images with effective or maximum intensity differences;
in (c1) and/or (c2), adjusting saturation to a level that increases visual contrast between the negative and positive regions of the color spectrum comprises displaying multiple images each with different saturation levels and receiving user input indicating one or more images with increased visual contrast between the negative and positive regions of the color spectrum; and/or
in (b2), determining an effective or maximum visual contrast between a negative region and a positive region of the color spectrum comprises displaying multiple images each with different hue levels and receiving user input indicating one or more images with increased visual contrast between the negative and positive regions of the color spectrum.

13. The method of claim 1, wherein:
in (b1), determining an effective or maximum intensity difference between a negative region and a positive region of the color spectrum of the colorimetric assay is carried out automatically by automatically calculating an intensity difference;
in (c1) and/or (c2), adjusting saturation to a level that increases visual contrast between the negative and positive regions of the color spectrum is carried out automatically using an image contrast determination tool; and/or
in (b2), determining an effective or maximum visual contrast between a negative region and a positive region of the color spectrum is carried out automatically using an image contrast determination tool.

14. The method of claim 1, wherein converting the image to a predefined color space comprises scale change and rotation and/or non-linear transformations achieved with one or more rounds of matrix operations.

15. The method of claim 1, further comprising keeping overlapping/ambiguous colors within a specified region of the color spectrum when enhancing the hue, saturation, or brightness of the image.

16. The method of claim 1, wherein the method results in a trinary color spectrum with separate colors for positive, negative, and ambiguous results.

17. The method of claim 1, wherein the method results in a binary color spectrum with separate colors for positive and negative results, without other colors.

18. The method of claim 1, wherein the method is at least partially carried out using one or more of image processing, computer vision, artificial intelligence, machine learning, deep learning, or neural networks, to carry out one or more of image acquisition, calibration, image correction, feature detection and extraction, visualization, classification, and interpretation of colorimetric results.

19. The method of claim 1, wherein iteratively adjusting one or more image parameters to further increase visual contrast between the negative and positive regions of the color spectrum comprises iteratively adjusting one or more of hue, saturation, or brightness.

20. A computer system for enhancing the visualization, classification, and/or interpretation of a photonic readout of a colorimetric assay, the colorimetric assay being associated with a defined color spectrum, the computer system comprising:
one or more processors; and
one or more hardware storage devices comprising instructions stored thereon that are executable by the one or more processors to cause the computer system to at least:
(A) receive an image of the photonic readout;
(B) convert the image to a predefined color space;
(C) enhance image saturation and hue by
(a1) desaturating the image;
(b1) rotating hue of the image to determine an effective or maximum intensity difference between a negative region and a positive region of the color spectrum of the colorimetric assay; and
(c1) selecting at least one hue level at which an effective or maximum intensity difference is exhibited, and for each selected hue level, increasing saturation to a level that increases visual contrast between the negative and positive regions of the color spectrum, thereby forming a color-adjusted image; or by
(a2) saturating the image;
(b2) rotating hue of the image to determine an effective or maximum visual contrast between a negative region and a positive region of the color spectrum of the colorimetric assay; and
(c2) selecting at least one hue level at which an effective or maximum visual contrast is exhibited, and for each selected hue level, decreasing saturation to a level that increases visual contrast between the negative and positive regions of the color spectrum, thereby forming a color-adjusted image;

(D) for each color-adjusted image, adjust a brightness level to further increase visual contrast between the negative and positive regions of the color spectrum, and (E) optionally, iteratively adjust one or more image parameters to further increase visual contrast between the negative and positive regions of the color spectrum.

21. An assay system for performing chemical and/or biochemical detection of one or more target analytes, the system comprising:

reagents and a test device configured to carry out a colorimetric assay without photonic readout; and a computer device comprising a camera, one or more processors, and one or more hardware storage devices comprising instructions stored thereon that are executable by the one or more processors to cause the computer system to at least carry out the method of claim 1.

* * * * *